US011363455B2

(12) United States Patent
Hillan

(10) Patent No.: US 11,363,455 B2
(45) Date of Patent: Jun. 14, 2022

(54) NEAR FIELD COMMUNICATION FORUM DATA EXCHANGE FORMAT (NDEF) MESSAGES WITH AUTHENTICATED ENCRYPTION

(71) Applicant: QUALCOMM Incorporated, San Diego, CA (US)

(72) Inventor: John Hillan, Alton (GB)

(73) Assignee: QUALCOMM INCORPORATED, San Diego, CA (US)

(*) Notice: Subject to any disclaimer, the term of this patent is extended or adjusted under 35 U.S.C. 154(b) by 293 days.

(21) Appl. No.: 16/533,662

(22) Filed: Aug. 6, 2019

(65) Prior Publication Data

US 2020/0228980 A1     Jul. 16, 2020

Related U.S. Application Data

(60) Provisional application No. 62/791,635, filed on Jan. 11, 2019.

(51) Int. Cl.
*H04L 29/06* (2006.01)
*H04W 12/06* (2021.01)
(Continued)

(52) U.S. Cl.
CPC ......... *H04W 12/06* (2013.01); *G06F 21/602* (2013.01); *G06F 21/64* (2013.01); *G06Q 20/32* (2013.01);
(Continued)

(58) Field of Classification Search
None
See application file for complete search history.

(56) References Cited

U.S. PATENT DOCUMENTS

2014/0256251 A1* 9/2014 Caceres .............. H04W 12/084
455/41.1
2016/0142210 A1* 5/2016 Hoyer .................. H04L 9/3247
380/270
(Continued)

OTHER PUBLICATIONS

Shen J., et al., "A Proposed Architecture for Building NFC Tag Services", 2013 Sixth International Symposium on Computational Intelligence and Design, IEEE, vol. 2, Oct. 28, 2013, pp. 48-52. (Year: 2016).*

(Continued)

*Primary Examiner* — Andrew J Steinle
(74) *Attorney, Agent, or Firm* — Kevin T. Cheatham

(57) ABSTRACT

A first apparatus may generate a set of Near Field Communication (NFC) Forum Data Exchange Format (NDEF) records, and each NDEF record of the set of NDEF records may include an NDEF record header and an NDEF record payload. The first apparatus may apply an authentication-encryption function to each NDEF record of the set of NDEF records based on the NDEF record header of each NDEF record, the NDEF record payload of each NDEF record, and a value associated with each NDEF record to obtain a set of authentication-encrypted NDEF record payloads respectively corresponding to the set of NDEF records. Each authentication-encrypted NDEF record payload may include an encrypted NDEF record payload and an authentication tag associated with a corresponding NDEF record. The first (Continued)

apparatus may transmit a protected NDEF message including the set of authentication-encrypted NDEF records to a second device.

34 Claims, 16 Drawing Sheets

(51) Int. Cl.
    | | |
    |---|---|
    | *H04W 12/033* | (2021.01) |
    | *H04W 12/47* | (2021.01) |
    | *H04W 12/106* | (2021.01) |
    | *G06F 21/64* | (2013.01) |
    | *H04W 12/03* | (2021.01) |
    | *G06F 21/60* | (2013.01) |
    | *H04L 9/08* | (2006.01) |
    | *H04L 9/40* | (2022.01) |
    | *G06Q 20/32* | (2012.01) |
    | *H04W 4/80* | (2018.01) |
    | *H04L 9/32* | (2006.01) |

(52) U.S. Cl.
    CPC ........ *H04L 9/0838* (2013.01); *H04L 63/0428* (2013.01); *H04W 12/03* (2021.01); *H04W 12/033* (2021.01); *H04W 12/106* (2021.01); *H04W 12/47* (2021.01); *H04L 9/32* (2013.01); *H04W 4/80* (2018.02)

(56) References Cited

U.S. PATENT DOCUMENTS

2016/0335619 A1   11/2016   Ce
2018/0132089 A1*   5/2018   Zhao .................... H04B 5/0025

OTHER PUBLICATIONS

Hameed S., et al., "Integrity Protection of NDEF Message with Flexible and Enhanced NFC Signature Records", 2015 IEEE Trustcom/Bigdatase/ISPA, IEEE, vol. 1, Aug. 20, 2015 (Aug. 20, 2015), pp. 368-375 (Year: 2015).*

Hameed S., et al., "Protecting NFC Data Exchange against Eavesdropping with Encryption Record Type Definition", NOMS 2016—2016 IEEE/IFIP Network Operations and Management Symposium, IEEE, Apr. 25, 2016, pp. 577-583 (Year: 2016).*

Hameed S., et al., "Protecting NFC Data Exchange against Eavesdropping with Encryption Record Type Definition", NOMS 2016—2016 IEEE/IFIP Network Operations and Management Symposium, IEEE, Apr. 25, 2016, XP032918153, DOI: 10.1109/NOMS.2016.7502861 [retrieved on Jun. 30, 2016] abstract, I. Introduction, IV. ERTD Middleware Design and Prototype Implementation, IV.A. NFC Writer, IV.B. NFC Reader, figures 3, 4, pp. 577-583.

International Search Report and Written Opinion—PCT /US2019/065865—ISA/EPO—dated Feb. 13, 2020.

Shen J., et al., "A Proposed Architecture for Building NFC Tag Services", 2013 Sixth International Symposium on Computational Intelligence and Design, IEEE, vol. 2, Oct. 28, 2013, XP032590399, DOI: 10.1109/ISCID.2013.126 [retrieved on Apr. 23, 2014] abstract, I. Introduction, III. Data Access Layer, III. C. Data Encryption & Decryption, figures 3, 4, pp. 48-52.

Sufian H., et al., "Integrity Protection of NDEF Message with Flexible and Enhanced NFC Signature Records", 2015 IEEE Trustcom/Bigdatase/ISPA, IEEE, vol. 1, Aug. 20, 2015 (Aug. 20, 2015), pp. 368-375, XP032819632, 8 pages, DOI: 10.1109/TRUSTCOM.2015.396, [retrieved on Dec. 2, 2015] the whole document.

* cited by examiner

NEAR FIELD COMMUNICATION FORUM DATA EXCHANGE FORMAT (NDEF) MESSAGES WITH AUTHENTICATED ENCRYPTION

CROSS-REFERENCE TO RELATED APPLICATION(S)

This application claims the benefit of U.S. Provisional Application Ser. No. 62/791,635, entitled "NEAR FIELD COMMUNICATION FORUM DATA EXCHANGE FORMAT (NDEF) MESSAGES WITH AUTHENTICATED ENCRYPTION" and filed on Jan. 11, 2019, which is expressly incorporated by reference herein in its entirety.

BACKGROUND

Field

The present disclosure relates generally to communication systems, and more particularly, to the communication of Near Field Communication (NFC) Forum Data Exchange Format (NDEF) messages.

Background

Advances in technology have resulted in smaller and more powerful personal computing devices. Personal computing devices include wireless handheld devices such as smart phones and tablet devices. Wireless handheld devices are configured to operate within wireless communication systems, and are widely deployed to provide various telecommunication services such as telephony, video, data, messaging, and broadcasts. Further, wireless handheld devices may be configured to communicate using a variety of frequencies and applicable coverage areas, such as cellular communications, wireless local area network (WLAN) communications, NFC, etc.

NFC is a short-range wireless technology, which typically requires a "near-field" separation (e.g., of 10 cm or less). NFC may involve an initiator and a target; the initiator actively generates an RF field that can power a passive target. The target may then transmit one or more messages to the initiator using the power of the RF field. This enables NFC targets to take low-complexity form factors such as unpowered tags, stickers, key fobs, or cards, etc. There exists a need for further improvements in NFC technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a first aspect of the disclosure, a first method, a first computer-readable medium, and a first apparatus are provided. The first apparatus may generate a set of Near Field Communication (NFC) Forum Data Exchange Format (NDEF) records, each NDEF record of the set of NDEF records including an NDEF record header and an NDEF record payload. The first apparatus may apply an authentication-encryption function to each NDEF record of the set of NDEF records based on the NDEF record header of each NDEF record, the NDEF record payload of each NDEF record, and a value associated with each NDEF record to obtain a set of authentication-encrypted NDEF record payloads respectively corresponding to the set of NDEF records, wherein each authentication-encrypted NDEF record payload includes an encrypted NDEF record payload and an authentication tag associated with a corresponding NDEF record. The first apparatus may transmit a protected NDEF message including the set of authentication-encrypted NDEF records to a second device, wherein each authentication-encrypted NDEF record includes the NDEF record header of the corresponding NDEF record and the authentication-encrypted NDEF record payload.

In a second aspect of the disclosure, a second method, a second computer-readable medium, and a second apparatus are provided. The second apparatus may receive a protected NDEF message including a set of authentication-encrypted NDEF records from a second device, each authentication-encrypted NDEF record of the set of authentication-encrypted NDEF records including an NDEF record header and an authentication-encrypted NDEF record payload having an encrypted NDEF record payload and an authentication tag. The second apparatus may authenticate each authentication-encrypted NDEF record of the set of authentication-encrypted NDEF records based on the NDEF record header of each authentication-encrypted NDEF record, the authentication tag of the authentication-encrypted NDEF record payload of each authentication-encrypted NDEF record, and a value associated with each authentication-encrypted NDEF record. The second apparatus may decrypt an encrypted NDEF record payload of an authentication-encrypted NDEF record payload of an authentication-encrypted NDEF record of the set of authentication-encrypted NDEF records when the authentication-encrypted NDEF record is authenticated. The second apparatus may refrain from obtaining an unprotected NDEF record payload corresponding to the authentication-encrypted NDEF record payload of the authentication-encrypted NDEF record of the set of authentication-encrypted NDEF records when the authentication-encrypted NDEF record is unauthenticated.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
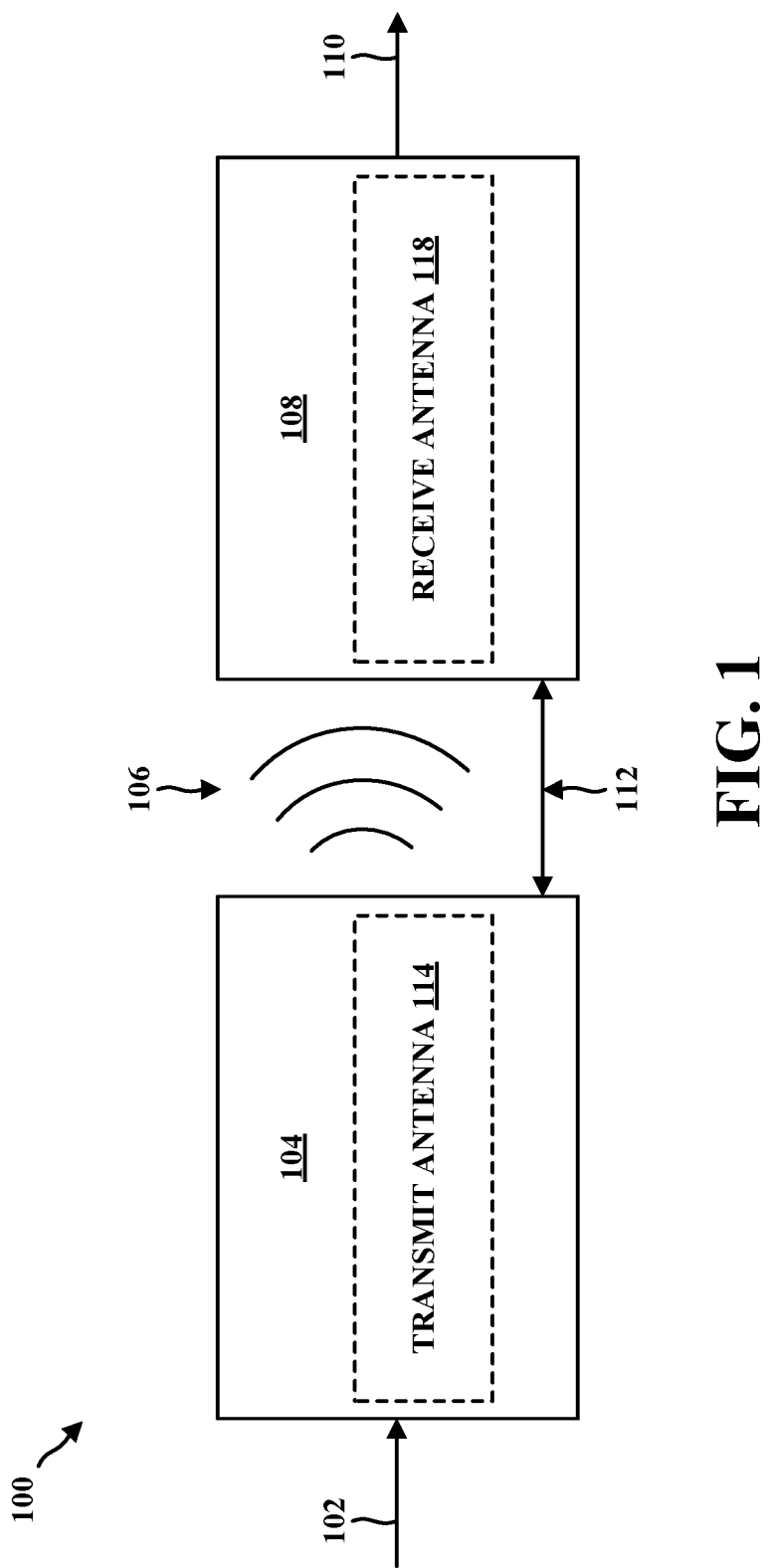
FIG. 1 is a block diagram of a wireless communication system in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structure.

FIG. 1 illustrates a Near Field Communication (NFC) system 100, in accordance with various aspects of the present disclosure. Input power 102 is provided to a initiator 104 for generating a radiated field 106 that provides energy transfer. A target 108 may couple to the radiated field 106 and generate an output power 110 that may be stored or used to power a device (not shown) coupled to the output power 110. Both the initiator 104 and the target 108 are separated by a distance 112. In certain configurations, initiator 104 and target 108 may be configured according to a mutual resonant relationship. When the resonant frequency of target 108 and the resonant frequency of initiator 104 are very close, transmission losses between the initiator 104 and the target 108 may be reduced when the target 108 is located in the "near-field" of the radiated field 106.

The initiator 104 may include a transmit antenna 114 for providing energy transmission. The target 108 may include a receive antenna 118 that provides energy reception. The transmit and receive antennas 114, 118 may be sized according to applications and devices associated therewith. An efficient energy transfer may be provided by coupling a large portion of the energy in the near-field of the transmit 114 antenna to the receive antenna 118 rather than propagating most of the energy in an electromagnetic wave to the "far-field" (e.g., a distance that is greater than distance 112). During NFC, a coupling mode may be developed between the transmit antenna 114 and the receive antenna 118. The area around the antennas 114 and 118 where the near-field coupling may occur is referred to herein as a coupling-mode region.

Figure 2:
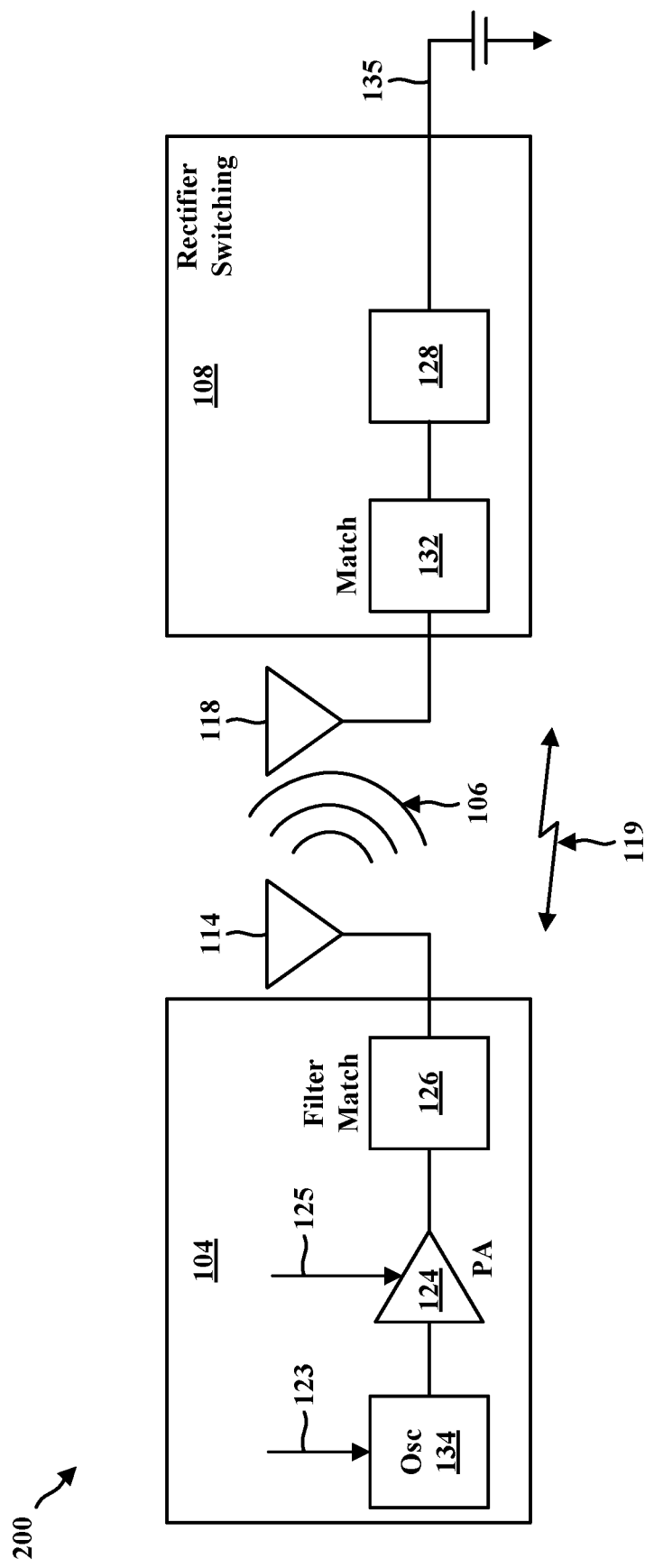
FIG. 2 is a schematic diagram of a wireless communication system in accordance with certain aspects of the disclosure.

FIG. 2 is a schematic diagram 200 of an example NFC system. The initiator 104 includes an oscillator 134, a power amplifier 124 and a filter and matching circuit 126. The oscillator 134 is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the initiator 104 to the transmit antenna 114.

The target 108 may include a matching circuit 132 and a rectifier and switching circuit 128 to generate a DC power output to charge a battery 135 or power a device coupled to the target 108 (not illustrated). The matching circuit 132 may be included to match the impedance of the target 108 to the receive antenna 118. The target 108 and initiator 104 may also communicate on a separate communication channel 119 (e.g., Bluetooth®, Zigbee®, Wi-Fi (802.11), cellular, etc.).

The target 108 may transmit one or more messages to the initiator 104 via an NFC link through the radiated field 106. The initiator 104 may also transmit one or more messages to the target 108. An example of a message may be an NFC Forum Data Exchange Format (NDEF) message. An NDEF message may include one or more NDEF records. An NDEF record may include an NDEF record header and an NDEF record payload. An NDEF record payload may include, for example, text (e.g., plaintext), a uniform resource identifier (URI), an image, device information, a signature, a smart poster, and so forth. An NDEF record header may include one or more fields for NFC, such as a signature and/or length associated with the NDEF record payload.

When NDEF messages are exchanged using peer-to-peer mode, the information in NDEF messages may be protected by encrypting information protocol data units (PDUs) that contain the NDEF message(s), such as when the link between the devices is established in a secure mode. However, if the link between the initiator and target is initially set up as an unencrypted link there may not be a mechanism by which the link can be changed to an encrypted link without breaking the unencrypted link. Furthermore, there may not be a mechanism for establishing a secure link between a reader/writer and a card. Consequently, an NFC link that is unsecure may be vulnerable. For example, an unsecure link may be vulnerable to malicious attacks, such as when the initiator and the target communicate without user interaction (e.g., in device-to-device communication).

A target (and/or an initiator) may protect information exchanged in an NDEF message by encrypting an adjacent higher layer. However, there may be use cases in which a shared secret needs to be derived between a reader/writer (e.g., target or initiator) and a card (e.g., initiator or target). For example, a target and/or initiator may separate the contents of an NDEF message into individual NDEF records. The target may then replace the payload of each NDEF record with an encrypted payload, and reassemble the NDEF message with individual NDEF records having encrypted payloads. While this mechanism may protect the confidentiality of the contents of the NDEF message, the NDEF message (and the constituent NDEF records) would remain unauthenticated.

Absent authentication, NDEF messages may still be exposed to some vulnerabilities even when the NDEF record payloads are themselves encrypted. For example, a malicious target may insert a valid encrypted payload into an NDEF record in a different context. An unsuspecting initiator, may then be vulnerable to receiving a valid encrypted payload which may serve a malicious or harmful purpose under a different context.

Accordingly, a mechanism to authenticate NDEF messages may be beneficial by ensuring that an encrypted payload is contextually consistent with the associated header. The present disclosure may describe various aspects of authenticating and encrypting NDEF messages so that NDEF messages are protected through both confidentiality and authentication. For example, the present disclosure describes aspects in which an NDEF message may be authenticated using the NDEF record header(s) of NDEF record(s) included in the NDEF message.

Figure 3A:
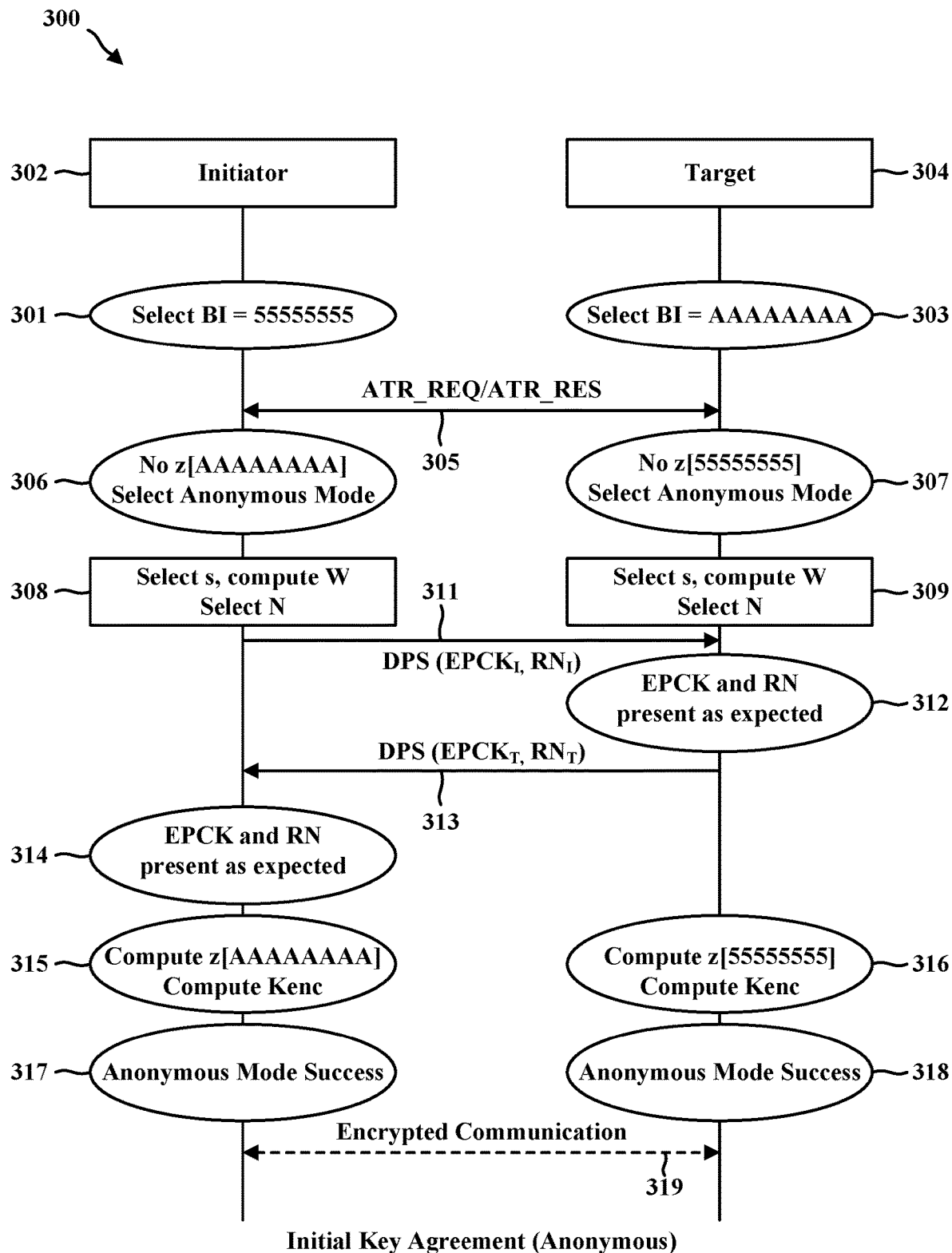
FIG. 3A is a data flow illustrating an anonymous key agreement procedure in accordance with certain aspects of the disclosure.
Figure 3B:
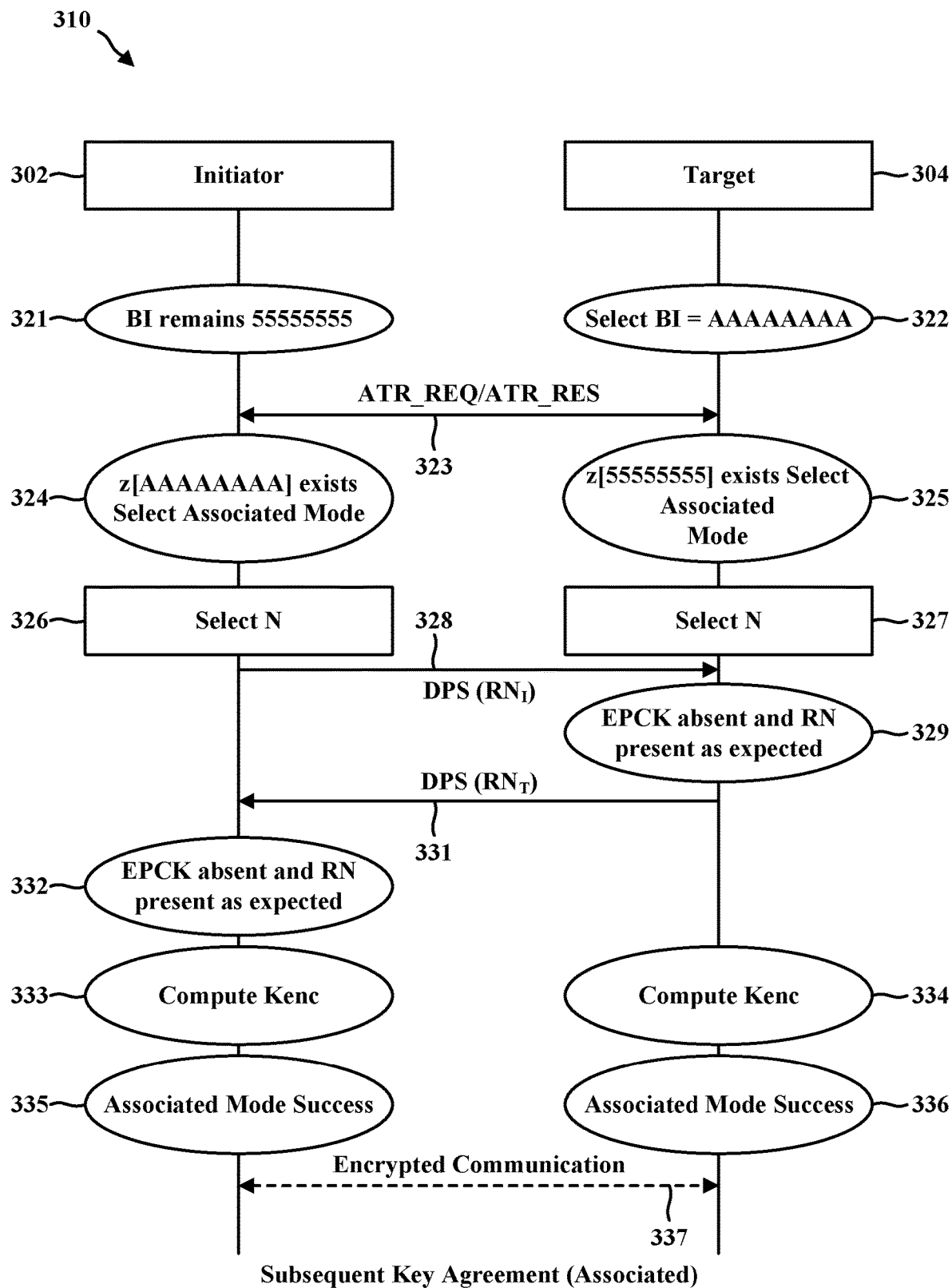
FIG. 3B is a data flow illustrating an associated key agreement procedure in accordance with certain aspects of the disclosure.

FIG. 3A is a data flow 300 illustrating an anonymous key agreement procedure in accordance with certain aspects of the disclosure. While FIGS. 3A and 3B illustrate one aspect of encapsulation of data, this aspect is to be regarded as illustrative and the present disclosure may be applicable to any number of different data encapsulation techniques.

As seen in FIG. 3A, an initiator 302 (e.g., initiator device) may determine and/or select (at 301) a first BI (e.g., first BI=55555555), and a target 304 (e.g., target device) may determine and/or select (at 303) a second BI (e.g., second BI=AAAAAAAA). The initiator 302 may transmit (at 305) an attribute request (ATR_REQ) PDU to the target 304. The ATR_REQ may include information associated with the first BI. The target 304 may respond by transmitting (at 305) an attribute response (ATR_RES) PDU to the initiator 302. The ATR_RES PDU may include information associated with the second BI.

The first BI and the second BI may be exchanged during a link activation process that is performed when the initiator 302 and/or the target 304 detect the presence of the other device (e.g., when the initiator 302 is placed within a predetermined distance from the target 304, or vice versa). In certain configurations, the first BI and the second BI may be used to convey a respective device identity under which a shared secret z can be associated or restored.

A BI may be chosen randomly when a device is used for the first time or after a factory reset. All values of shared secret z which are associated with a BI of a remote device may be destroyed whenever a new BI is chosen. The BI parameter value may be encoded as a sequence of eight octets representing the BI integer value with a particular conversion. A receiving device may apply the particular conversion to obtain the BI integer value received in the ATR_REQ_PDU or the ATR_RES_PDU.

The initiator 302 may determine (at 306) a shared secret (e.g., No z[AAAAAAAA]) based at least in part on the second BI. The target 304 may determine (at 307) the shared secret (e.g., No z[55555555]) based at least in part on the first BI.

Each of the initiator 302 and the target 304 may determine (at 308 and 309, respectively) a valid set of elliptic curve domain parameters as Curve P-256. Both the initiator 302 and the target 304 may determine a valid private key s (at 308 and 309, respectively), associated with the valid set of elliptic curve domain parameters. The valid private key s may be the output of a random or pseudo-random process. Each of the initiator 302 and the target 304 may determine a public key W=sG (at 308 and 309, respectively), with the sample base point G on Curve P-256. Each of the initiator 302 and the target 304 may determine (at 308 and 309, respectively) a random nonce N as 64 bits of output from a random or pseudo-random process.

The initiator 302 may transmit (at 311) a first PDU to the target 304. In certain configurations, the first PDU may be a data protection setup (DPS) PDU. The first PDU may include an elliptic curve public key (ECPK)$_I$ parameter that corresponds to the public key W and an random number (RN)$_I$ parameter that corresponds to the nonce N, respectively.

When the first DPS PDU does not contain a valid ECPK parameter that corresponds to the public key W determined (at 309) by the target 304 and/or a valid random number (RN) parameter that corresponds to the nonce N determined (at 309) by the target 304, the target 304 may terminate the key agreement procedure with an "abort" indication (not shown in FIG. 3A). When the first DPS PDU does not contain a valid EPCK parameter and/or a valid RN parameter, the target 304 may implement a bonding signal problem mechanism (not shown in FIG. 3A) and terminate the key agreement procedure with an "abort" indication (not shown in FIG. 3A). In certain configurations, the target 304 may implement the bonding signal problem mechanism by sending an empty DPS PDU (not shown in FIG. 3A) to the initiator 302. In certain other configurations, the target 304 may implement the bonding signal problem mechanism by not responding. In certain other configurations, the target 304 may implement the bonding signal problem mechanism by responding with a PDU with at least one term (e.g., EPCK, RN, etc.) absent. In certain other configurations, the target 304 may implement the bonding signal problem mechanism by responding with a PDU containing an error code. Receiving a first DPS PDU that does not include a valid EPCK parameter and/or valid RN parameter may indicate to the target 304 that a bonding problem has occurred, and that the initiator 302 is attempting anonymous key agreement, while the target 304 is expecting associated key agreement. Otherwise, when the first DPS PDU does contain a valid ECPK parameter and a valid RN parameter, the target 304 may determine (at 312) that the first DPS PDU contains a valid ECPK parameter and a valid RN parameter, and the target 304 may extract public key W' and nonce N' from the $ECPK_I$ and $RN_I$ parameter, respectively, and set $N_T=N$ and $N_I=N'$.

The target 304 may send (at 313) a second DPS PDU that includes an $ECPK_T$ parameter that corresponds to the public key W and a $RN_T$ parameter that corresponds to the nonce N, respectively. If the second DPS PDU does not contain a valid ECPK parameter and a valid RN parameter, then the initiator 302 may terminate the key agreement procedure with an "abort" indication (not shown in FIG. 3A). Receiving a DPS PDU that does not contain a valid ECPK and a valid RN parameter may indicate to the initiator 302 that a bonding problem has occurred, and the target 304 may be attempting an associated key agreement. Otherwise, the initiator 302 may determine (at 314) that the second DPS PDU contains a valid ECPK parameter and a valid RN parameter, and the initiator 302 may extract the public key W' and nonce N' from the $ECPK_T$ and $RN_T$ parameter, respectively, and set $N_I=N$ and $N_T=N'$.

When both the first DPS PDU and the second DPS PDU include a valid ECPK and a valid RN parameter, the initiator 302 and the target 304 may each determine an elliptic curve point P=sW', associated with the valid set of elliptic curve domain parameters.

If the initiator 302 and/or the target 304 determines that P=O (e.g., the elliptic point is at infinity), the initiator 302 and/or the target 304 may terminate the key agreement procedure with an "error" indication. The initiator 302 and the target 304 may determine (at 315 and 316, respectively) the shared secret value z (e.g., z[AAAAAAAA] and z[55555555] is equal to $x_P$, $x_P$ is the x-coordinate of P.

The initiator 302 and/or the target 304 may determine $K=N_I\|N_T$, which may be a concatenation of the nonces exchanged in the first DPS PDU and the second DPS PDU. In certain configurations, K may be a 128-bit key.

The initiator 302 and the target 304 may determine (at 315 and 316, respectively) an encrypted key Kenc using an authentication algorithm AES-CMAC, K described above, and z, such that Kenc=AES-CMACK(z).

The initiator 302 and the target 304 may initialize a respective Send Packet Counter PC(S) and Receive Packet Counter PC(R) to zero. The initiator 302 and the target may destroy the private key s. If both the initiator and the target transmit the BI parameter and the OPT parameter with BM bit set to one, then the initiator and the target may maintain the shared secret value z for future associated key agreement with the other device by correlating the secret value z with the received BI parameter value of the other device. Otherwise, the initiator and/or the target may destroy the shared secret value z.

As seen in FIG. 3A, the anonymous key agreement is successful (at 317, 318), and encrypted communication may be performed (at 319) between the initiator 302 and the target 304. For example, the encrypted communication may include sending one or more encrypted NDEF messages from the target 304 to the initiator 302, or vice versa.

FIG. 3B is a data flow 310 illustrating an associated key agreement procedure in accordance with certain aspects of the disclosure.

As seen in FIG. 3B, the first BI associated with the initiator 302 remains (at 321) the same (e.g., first BI=55555555), and the second BI associated with the target 304 remains (at 322) the same (e.g., second BI=AAAAAAAA). The initiator 302 may transmit (at 323) a ATR_REQ that includes the first BI to the target 304. The target 304 may respond by transmitting (at 323) a ATR_RES that includes the second BI to the initiator 302.

The initiator 302 may determine (at 324) that a shared secret (e.g., z[AAAAAAA]) is associated with the second BI (e.g., indicating that an anonymous key agreement was previously performed). The target 304 may also determine (at 325) that the shared secret (e.g., z[5555555]) is associated with the first BI.

The initiator 302 may determine (at 326) a nonce N as 64 bits of output from a random or pseudo-random process. The target 304 may also determine (at 327) a nonce N as 64 bits of output from a random or pseudo-random process.

The initiator 302 may transmit (at 328) a first DPS PDU with nonce $N_I$ as the value of a $RN_I$ parameter and await receipt of a second DPS PDU transmitted (at 331) by the target 304. The target 304 may receive the first DPS PDU transmitted (at 328) by the initiator 302. If the received first DPS PDU does not contain a valid RN parameter, the target 304 may terminate the key agreement procedure with an "abort" indication. If the received first DPS PDU also contains a valid EPCK parameter, the target 304 may destroy the shared secret z[5555555] correlated with the first BI parameter value from the anonymous key agreement. The target 304 may implement a bonding problem signal mechanism (not shown in FIG. 3B), and terminate the key agreement procedure with an "abort" indication. In certain configurations, the target 304 may implement the bonding signal problem mechanism by sending an empty DPS PDU to the initiator 302. In certain other configurations, the target 304 may implement the bonding signal problem mechanism by not responding. In certain other configurations, the target 304 may implement the bonding signal problem mechanism by responding with a PDU with at least one term (e.g., EPCK, RN, etc.) absent. In certain other configurations, the target 304 may implement the bonding signal problem mechanism by responding with a PDU containing an error code.

Receiving the first DPS that contains both a valid RN and a valid EPCK parameter (not shown in FIG. 3B) may indicate that a bonding problem has occurred and the initiator is attempting anonymous key agreement. Otherwise, as illustrated in FIG. 3B, when the target 304 determines (at 329) that the first DPS PDU includes a valid RN and the EPCK is absent from the first DPS PDU as expected, the target 304 may extract nonce N' from the RN parameter and set $N_T=N$ and $N_I=N'$. The target 304 may transmit (at 331) the second DPS PDU with the nonce N as the value of a RN parameter.

If the second DPS PDU transmitted (at 331) by the target 304 does not include a valid RN parameter (not shown in FIG. 3B), the initiator 302 may remove and/or destroy the shared secret z[AAAAAAA] for the target 304 correlated with the second BI parameter value from the anonymous key agreement. The initiator 302 may terminate the associated key agreement procedure with an "abort" indication (not shown in FIG. 3B). Receiving a DPS PDU that does not include a valid RN parameter may indicate that a bonding problem has occurred and the target 304 is attempting anonymous key agreement (not shown in FIG. 3B). Otherwise, as illustrated in FIG. 3B, when the initiator 302 determines (at 332) that the second DPS PDU includes a valid RN and the EPCK is absent from the second DPS PDU as expected, the initiator 302 may extract nonce N' from the RN parameter and set $N_I$=N and $N_T$=N'. In certain configurations, the initiator 302 and the target 304 may determine the shared secret associated with the first BI and/or the second BI that was maintained after the anonymous key agreement. The In certain other configurations, the initiator 302 and/or the target 304 may determine K=$N_I$||$N_T$, which may be a concatenation of the nonces NI and NT exchanged in the first DPS PDU and the second DPS PDU.

The initiator 302 and the target 304 may determine (at 333, 334) KENC=AES-CMACK(z) using an authentication algorithm (e.g., AES-CMAC), where K is a 128-bit key, message M=z, and the length of z in octets len=32.

In certain configurations, the initiator 302 and the target 304 may initialize a respective Send Packet Counter PC(S) and Receive Packet Counter PC(R) to zero.

As seen in FIG. 3B, the initiator 302 and the target 304 may determine (at 335, 336) that associated key agreement is successful, and encrypted communication may be performed (at 337) between the initiator 302 and the target 304. For example, the encrypted communication may include sending ones or more encrypted NDEF messages from the target 304 to the initiator 302, or vice versa.

There may be no mechanism that enables NFC devices take advantage of the shared secret to secure NDEF messages. The present disclosure may provide some techniques and solutions to securing NDEF message communications by enabling an initiator to encrypt and authenticate an NDEF message and enabling the target to decrypt and authenticate the NDEF message using the shared secret.

Figure 4A:
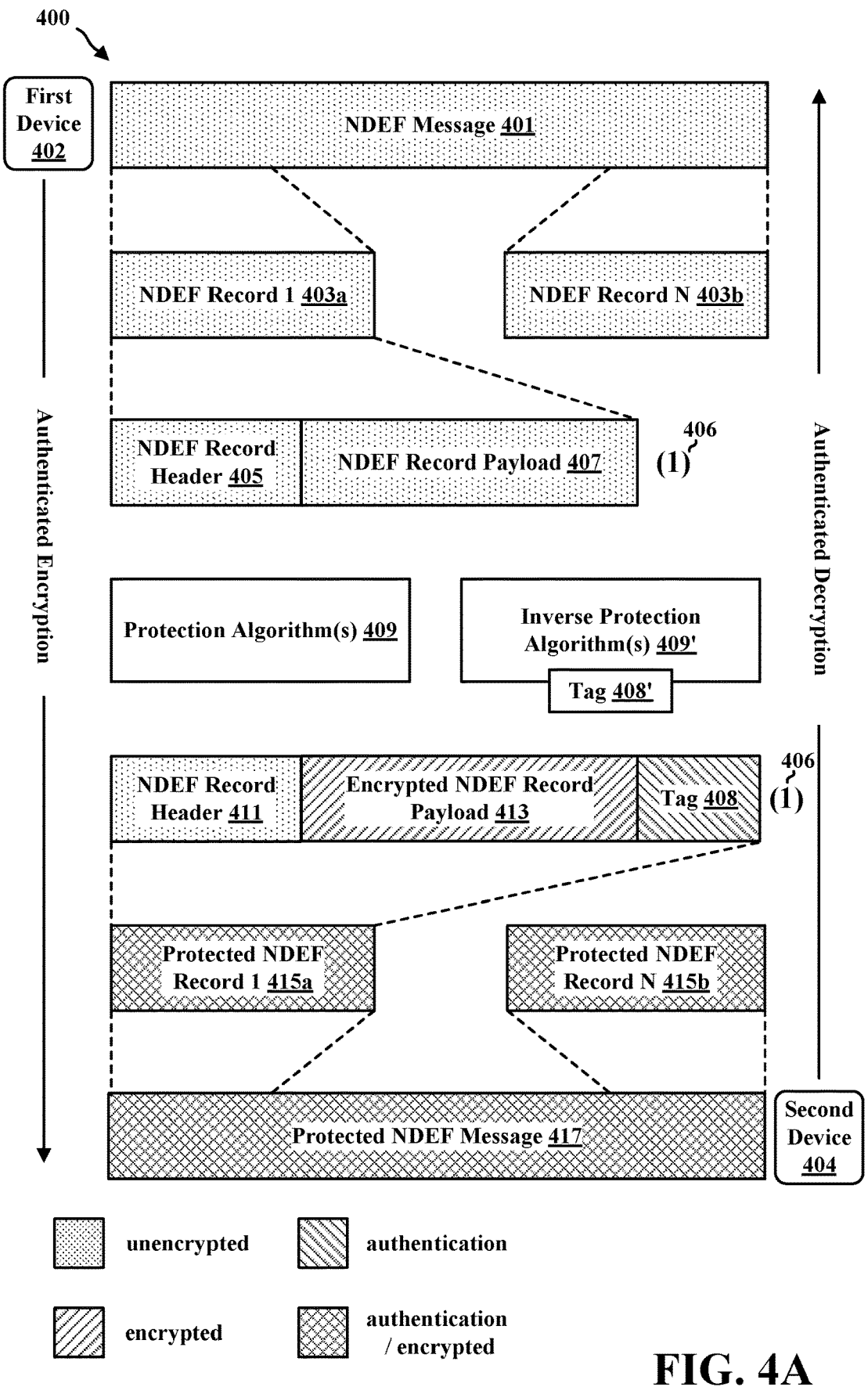
FIGS. 4A, 4B, and 4C illustrate mechanisms for NDEF message authentication encryption and NDEF message authentication decryption in accordance with certain aspects of the disclosure.
Figure 4B:
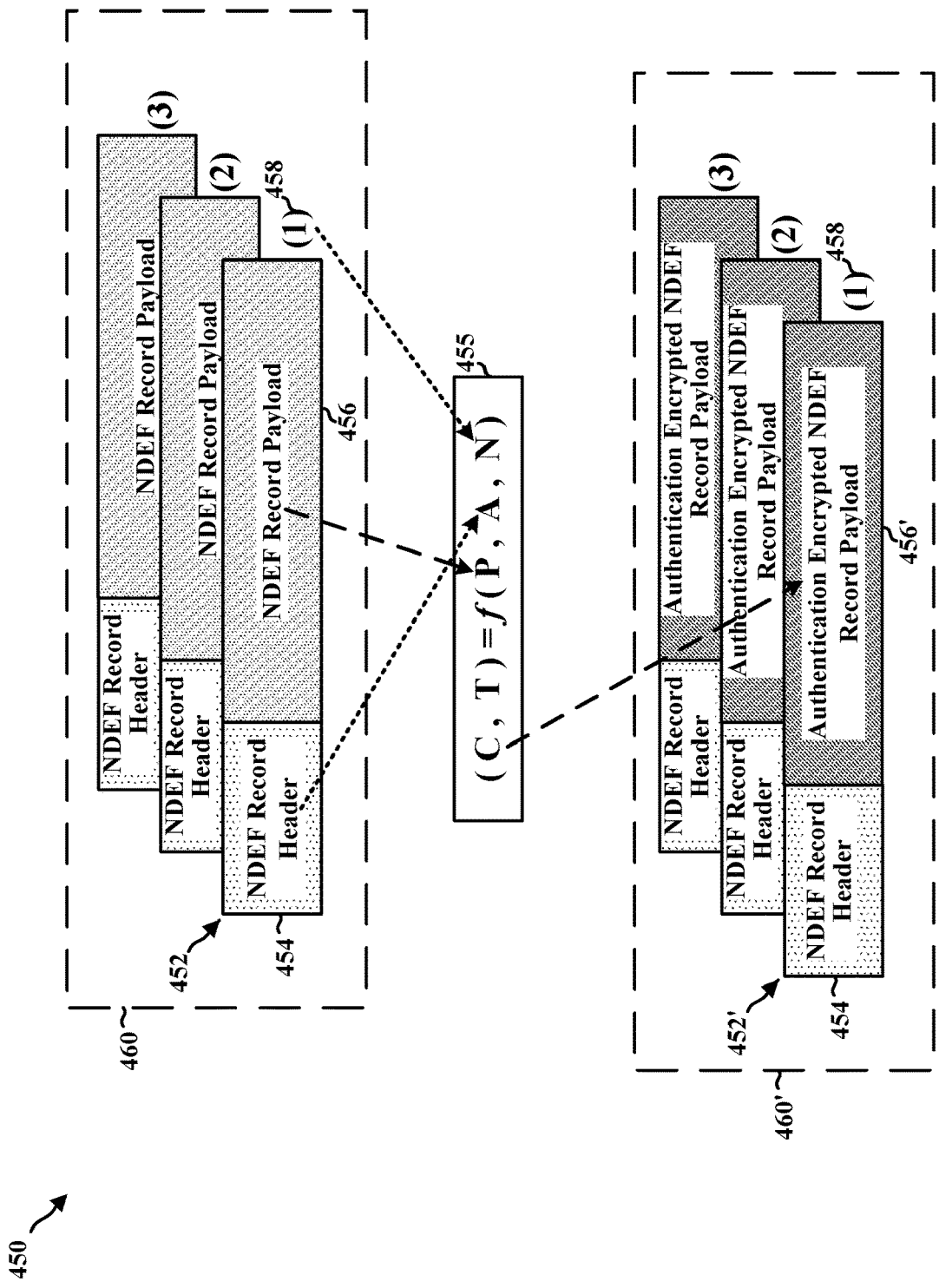
Figure 4C:
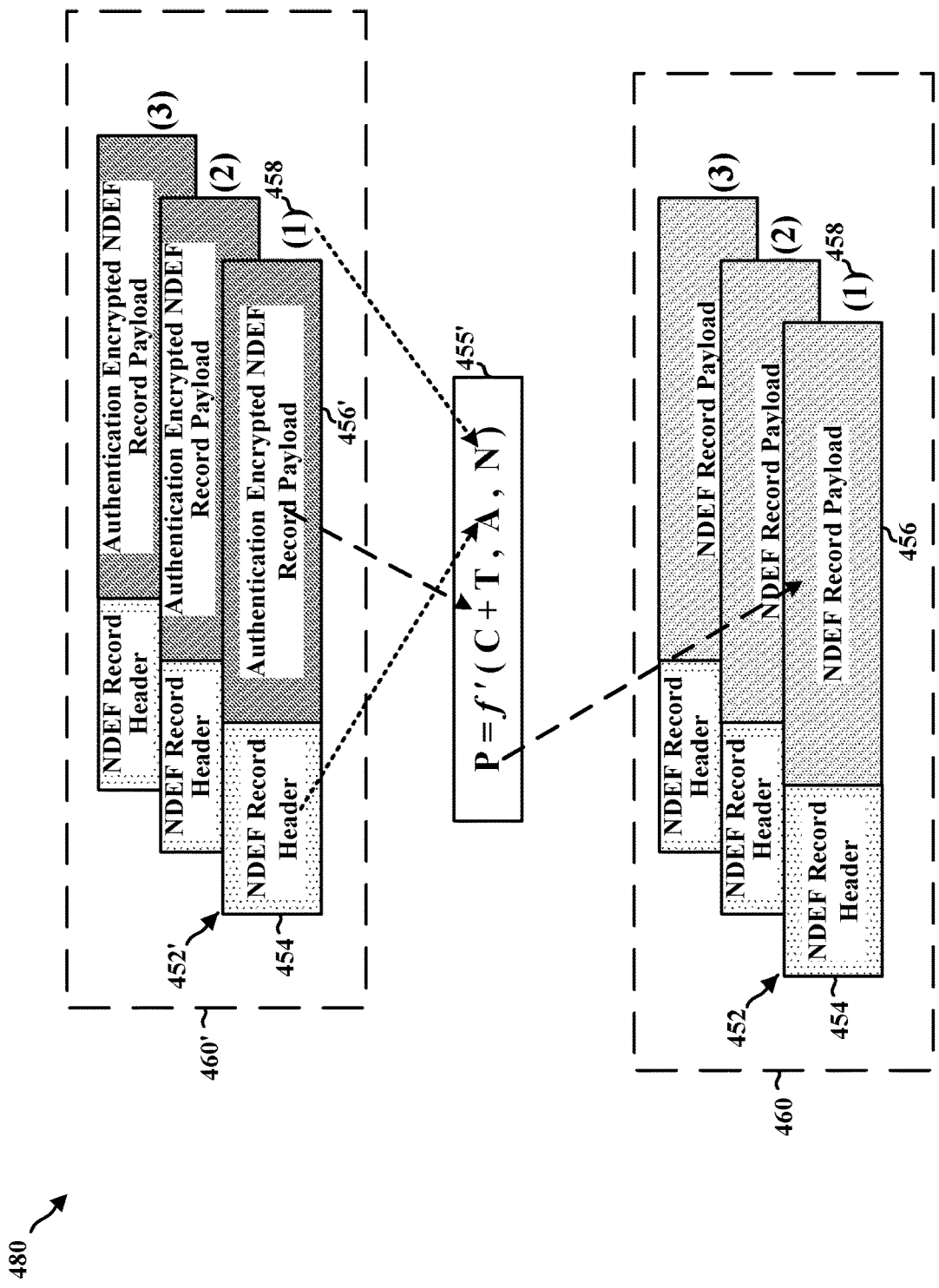

FIG. 4A illustrates an example mechanism 400 that may protect an NDEF message (e.g., by providing a mechanism 450 for encryption and authentication of the NDEF message as shown in FIG. 4B and a complimentary or inverse mechanism 480 for decryption and authentication of the NDEF message as shown in FIG. 4C). The first device 402 may correspond to the initiator 104, 302, the target 108, 304, and/or another apparatus. The second device 404 may correspond to the initiator 104, 302, the target 108, 304, and/or a different apparatus. In certain implementations, the example mechanism 400 may be performed using public key cryptography or symmetric key cryptography upon generating an encryption key such as a shared secret, a public key, and/or a symmetric key. FIG. 3A and/or FIG. 3B may describe various techniques for key cryptography (e.g., public key cryptography or symmetric key cryptography). However, the present disclosure is not limited to public key cryptography or symmetric key cryptography, and any suitable cryptographic algorithm may be used.

Referring to FIG. 4A, the first device 402 may generate an unprotected NDEF message 401. In certain aspects, the unprotected NDEF message 401 may include one or more NDEF records 403a, 403b that each include an NDEF record header 405 and an unencrypted NDEF record payload 407.

Prior to transmission, the first device 402 may apply an authentication-encryption function to the unprotected NDEF message 401 by applying a protection algorithm 409. For example, the first device 402 may extract each unprotected NDEF record 403a, 403b (e.g., including a plain text payload) from the unprotected NDEF message 401. Upon extraction, the first device 402 may apply the protection algorithm 409 to each unprotected NDEF record 403a, 403b to provide for authenticated encryption of the NDEF records 403a, 403b.

For encryption, the protection algorithm 409 may include an encryption algorithm (e.g., an encryption key such as the shared secret, the public key, and/or the symmetric key determined using the technique(s) described above in connection with any of FIGS. 3A and 3B) to at least partially generate a protected NDEF message 417. The first device 402 may encrypt the NDEF record payload 407 using any suitable cryptographic algorithm, such as public key cryptography, symmetric key cryptography, or another cryptographic algorithm. According to one example, the protection algorithm 409 may encrypt the NDEF record payload 407 based at least in part on the at least one encryption key to generate an encrypted NDEF record payload 413 for each of the one or more security protected NDEF records 415a, 415b (e.g., authenticated-encrypted NDEF records).

In addition to encryption, the first device 402 may further provide for authentication of the NDEF message 401 by applying a protection algorithm 409. In some aspects, the protection algorithm 409 may include two algorithms: a first algorithm for encryption and a second algorithm for authentication. In other aspects, the protection algorithm 409 may be realized in one algorithm configured for both encryption and authentication, such as an authentication-encryption algorithm similar to an Authenticated Encryption (AE) with Associated Data (AEAD) encryption algorithm. FIGS. 4B and 4C illustrate an example of such a protection function $f$ 455 and the inverse protection function $f'$ 455'.

The structure of the NDEF message 401 may be amenable to the use of authentication-encryption algorithms, which may be based on block ciphers. Examples of such authentication-encryption algorithms include Counter with Cipher Block Chaining (CBC) Message Authentication Code (MAC) (CBC-MAC) (CCM) Mode (National Institute of Standards and Technology (NIST) 800-38C), Galois/Counter Mode (GCM) (NIST 880-38D), or another authentication-encryption algorithm. In another example, the protection algorithm 409 may include an AEAD algorithm, which may provide confidentiality, integrity, and authenticity assurances for the unprotected NDEF message 401.

When implemented as an authentication-encryption algorithm, the protection algorithm 409 may be configured to receive a payload (e.g., to be authenticated and encrypted), auxiliary data (e.g., to be authenticated but not encrypted), and a unique value (e.g., to seed the protection algorithm 409). For example, the first device 402 may apply the protection algorithm 409 based on the NDEF record payload 407 as the algorithm payload, the NDEF record header 405 as the auxiliary data, and a corresponding record value 406 as the unique value.

In some aspects, the corresponding record value 406 may be a respective number of each unprotected NDEF record 403a, 403b (e.g., the numerical position of the NDEF record 403a in the unprotected NDEF message 401) or a respective nonce corresponding to each unprotected NDEF record 403a, 403b. In other aspects, the corresponding record value 406 may be derived from a respective number of each unprotected NDEF record 403a, 403b (e.g., the numerical position of the NDEF record 403a in the unprotected NDEF message 401) or a respective nonce corresponding to each unprotected NDEF record 403a, 403b. The inclusion of the corresponding record value 406 for each record 403a, 403b may provide various advantages for cryptographic strength.

With authenticated-encryption, the output of the protection algorithm 409 may include the encrypted NDEF record payload 413 (e.g., ciphertext) and a message authentication tag 408 (e.g., a tag may also be known as a message authentication code (MAC) or, simply, a tag). In other words, the protection algorithm 409 may receive the NDEF record header 405, the unencrypted NDEF record payload 407, and the corresponding value 406 as inputs and, responsively, the protection algorithm 409 may output the encrypted NDEF record payload 413 and the tag 408 based on the inputs.

The tag 408 may be combined with the encrypted NDEF record payload 413 and included in that field of a respective NDEF record 403a, 403b. Depending upon the protection algorithm 409, the tag 408 may be embedded in the encrypted NDEF record payload 413 (e.g., embedded in the ciphertext). Alternatively, the tag 408 may be appended to the NDEF record payload 413. In one aspect, the tag 408 may be or may include a checksum.

The first device 402 may then construct each authenticated-encrypted (e.g., "protected") NDEF record 415a, 415b by including the encrypted NDEF record payload 413 and the tag 408 in each payload field of each authentication-encrypted NDEF record 415a, 415b. The first device 402 may append the encrypted NDEF record payload 413 and the tag 408 to an associated NDEF record header 411 for each of the one or more protected NDEF records 415a, 415b.

The associated NDEF record header 411 may be unencrypted; however, the authentication may still provide a level of protection for the associated NDEF record header 411. In some aspects, the associated NDEF record header 411 may be unchanged from the initial NDEF record header 405. However, the associated NDEF record header 411 may be modified based on the protection algorithm 409. For example, the initial length included in the initial NDEF record header 405 may be modified to reflect the modified length of the encrypted NDEF record payload 413 (e.g., absent the tag 408, even though the tag 408 may be included in the field of the encrypted NDEF record payload 413). In another example, if the size of the encrypted NDEF record payload 413 differs from the size of the NDEF record payload 407, the first device 402 may modify the NDEF record header 411 of each authentication-encrypted NDEF record 415a, 415b accordingly.

The first device 402 may assemble the one or more NDEF records 415a, 415b that each include the encrypted NDEF record payload 413 and tag 408 with the associated NDEF record header 411 to generate an authenticated-encrypted (e.g., "protected") NDEF message 417. Upon authentication encryption, the first device 402 may transmit the protected NDEF message 417 to the second device 404 using short-range communication, such as NFC.

Upon receipt of the protected NDEF message 417, the second device 404 may authenticate and decrypt the protected NDEF message 417 to extract the authenticated unencrypted (e.g., "unprotected") NDEF message 401 requested by the second device 404. In certain aspects, the second device 404 may apply the inverse protection algorithm 409' to obtain the unprotected NDEF message 401.

The application of the inverse protection algorithm 409' may be described in FIG. 4C with respect to the inverse protection function $f$ 455'.

For example, the second device 404 may extract each of the protected NDEF records 415a, 415b, and authenticate and decrypt each of the NDEF records 415a, 415b to obtain the unencrypted NDEF record payload 407 for each of the one or more NDEF records 403a, 403b.

In certain aspects, the second device 404 may use the tag 408 to check the authenticity of the protected NDEF records 415a, 415b, including the authenticity of both the NDEF record header 411 and the encrypted NDEF record payload 413, before decrypting the encrypted NDEF record payload 413. For example, the second device 404 may apply the inverse protection algorithm 409' based on the encrypted NDEF record payload 413 as the algorithm payload, the NDEF record header 411 as the auxiliary data, and the corresponding record value 406 as the unique value.

In application of the inverse protection algorithm 409', the second device 404 may authenticate each protected NDEF record 415a, 415b by first generating an expected tag 408'. The mechanism through which the second device 404 generates the expected tag 408' may be similar or identical to the mechanism through which the first device 402 generates the tag 408 combined with the encrypted NDEF record payload 413.

For example, the second device 404 may apply the inverse protection algorithm 409' with the NDEF record header 411 as the auxiliary data and the corresponding record value 406 as the unique value. Here, similar to the application of the protection algorithm 409, the corresponding record value 406 may be the number of the protected NDEF record 415a (e.g., the numerical position of the NDEF record 415a in the protected NDEF message 417) or a nonce corresponding to the protected NDEF record 415a. In other aspects, the corresponding record value 406 may be derived from the number of the protected NDEF record 415a (e.g., the numerical position of the NDEF record 415a in the protected NDEF message 417) or a nonce corresponding to the protected NDEF record 415a.

The second device 404 may compare the expected tag 408' with the tag 408 included in a respective one of the protected NDEF records 415a, 415b. If the expected tag 408' matches the tag 408 (e.g., if the checksums are equal), then the second device 404 has authenticated the respective one of the protected NDEF records 415a, 415b. If the second device 404 authenticates the respective one of the protected NDEF records 415a, 415b, the second device 404 may proceed in applying the inverse protection algorithm 409' to decrypt the encrypted NDEF record payload 413.

If, however, the expected tag 408' does not match the tag 408 (e.g., if the checksums are unequal), then the second device 404 has determined the respective one of the protected NDEF records 415a, 415b is unauthenticated. In one aspect, if the second device 404 determines the respective one of the NDEF records 415a, 415b is unauthenticated, the second device 404 may refrain from obtaining the unencrypted NDEF record payload 407—e.g., because the respective one of the NDEF records 415a, 415b may be malicious, harmful, corrupted, etc. In one aspect, if the second device 404 determines the respective one of the NDEF records 415a, 415b is unauthenticated, the second device 404 may discard that respective one of the NDEF records 415a, 415b—e.g., because the respective one of the NDEF records 415a, 415b may be malicious, harmful, corrupted, etc.

In another aspect, if the second device 404 determines the respective one of the NDEF records 415a, 415b is unauthenticated, the second device 404 may indicate a failure of the unprotected NDEF message 401 to an application expecting the unprotected NDEF message 401, such as by removing each NDEF record payload 413 of each protected NDEF records 415a, 415b that is unauthenticated and setting a length field of each NDEF record header 405 of each protected NDEF record 415a, 415b that is unauthenticated to zero. In another aspect, if the second device 404 determines the respective one of the NDEF records 415a, 415b is unauthenticated, the second device 404 may replace each NDEF record payload 413 of each protected NDEF record 415a, 415b that is unauthenticated with an indication (e.g., code) that indicates each of the protected NDEF records 415a, 415b is unauthenticated. In another aspect, if the second device 404 determines the respective one of the NDEF records 415a, 415b is unauthenticated, the second device 404 may determine the entire protected NDEF message 417 is unauthenticated (e.g., corrupted).

When the second device 404 authenticates the respective one of the protected NDEF records 415a, 415b and subsequently decrypts the encrypted NDEF record payload 413, the second device 404 may obtain a respective one of the NDEF records 403a, 403b that includes the unencrypted NDEF record payload 407 and the associated NDEF recorder header 405. The second device 404 may assemble the one or more NDEF records 403a, 403b to obtain the unprotected NDEF message 401.

In some aspects, when the NDEF record header 411 of one of the authentication-encrypted NDEF records 415a, 415b is modified by the first device 402 (e.g., the associated NDEF record header 411 may be modified based on the protection algorithm 409 to reflect the modified length of the encrypted NDEF record payload 413 and/or to reflect the size of the encrypted NDEF record payload 413), then the second device 404 may recover the initial header 405 (e.g., after applying the inverse protection algorithm 409'). For example, the second device 404 may recover the initial NDEF record header 405 to reflect the size of the NDEF record payload 407 after application of the inverse protection algorithm 409'. The second device 404 may assemble the one or more NDEF records 403a, 403b to obtain the unprotected NDEF message 401 with the initial NDEF record header 405 obtained from the modified NDEF record header 411 for each NDEF record 403a, 403b.

Using the technique(s) described herein in connection with FIGS. 4A, 4B, and 4C, NFC devices of the present disclosure may verify the contents of each NDEF record and decrypt the contents to recover the original messages and, therefore, secure NDEF messages may be communicated between an initiator and a target. This authenticated encryption/decryption may be advantageous over some other mechanisms, such as mechanisms in which only the NDEF record payload is encrypted without authentication, because spoofing an application receiving an NDEF message by changing an NDEF record header is nearly impossible. For example, changing MIME code from application/cwt to application/cbor to attempt to bypass CBOR Web Token checking is impractical.

FIGS. 4B and 4C illustrate mechanisms 450, 480 for authentication encryption of an NDEF message, in accordance with various aspects of the present disclosure. Referring to the NDEF message 460, in the context of FIG. 4A, the unprotected NDEF message 460 may be implemented as the unprotected NDEF message 401, each unprotected NDEF record 452 may be implemented as at least one of the unprotected NDEF records 403a, 403b, each NDEF record header 454 may be implemented as the NDEF record header 405, the unprotected NDEF record payload 456 may be implemented as the unencrypted NDEF record payload 407, and the number 458 may be implemented as the record value 406. The function 455 may be implemented as the protection algorithm(s) 409 of FIG. 4A.

Referring to the NDEF message 460', in the context of FIG. 4A, the protected NDEF message 460' may be implemented as the protected NDEF message 417, each authentication-encrypted NDEF record 452' may be implemented as at least one of the protected NDEF records 415a, 415b, each NDEF record header 454 may be implemented as the NDEF record header 411, the authentication-encrypted NDEF record payload 456' may be implemented as the encrypted NDEF record payload 413, and the number 458 may be implemented as the record value 406. The inverse function 455' may be implemented as the inverse protection algorithm 409' of FIG. 4A.

Referring to FIG. 4B, the first device 402 may generate an unprotected NDEF message 460 that may include a set of unprotected NDEF records. For example, the set of unprotected NDEF records may include an unprotected NDEF record 452. The unprotected NDEF record 452 may include an NDEF record header 454 and an unencrypted NDEF record payload 456. The unprotected NDEF record 452 may be associated with a number 458, which may be a location of the unprotected NDEF record 452 in the NDEF message 460 or a nonce associated with the unprotected NDEF record 452.

The first device 402 may extract each unprotected NDEF record 452 from the unprotected NDEF message 460 and apply an authentication-encryption function 455 to the unprotected NDEF record 452. For example, the first device 402 may input, to the function 455, the unprotected NDEF record payload 456 as the plaintext P, the NDEF record header 454 as the associated data A, and the number 458 as the number N (also known as a nonce). The first device 402 may obtain, as outputs from the function 455, a ciphertext C and an authentication tag T.

The first device 402 may then create an authentication-encrypted NDEF record 452' with the NDEF record header 454 and the ciphertext C as the authentication-encrypted NDEF record payload 456'. The tag T may be appended to or included in the authentication-encrypted NDEF record payload 456'.

The first device 402 may repeat this process using the function 455 for a set of NDEF records. The first device 402 may then assemble the set of authentication-encrypted NDEF records, including the authentication-encrypted NDEF record 452' in an authentication-encrypted (e.g., "protected") NDEF message 460'. The first device 402 may transmit the authentication-encrypted NDEF message 460' over an NFC link to the second device 404.

Referring to FIG. 4C, the second device 404 may receive the authentication-encrypted NDEF message 460' over an NFC link from the first device 402. The second device 404 may extract each authentication-encrypted NDEF record 452' from the authentication-encrypted NDEF message 460' and apply an inverse authentication-encryption function 455' to the authentication-encrypted NDEF record 452'. For example, the second device 404 may input, to the inverse function 455', the authentication-encrypted NDEF record payload 456' as the ciphertext C and tag T, the NDEF record header 454 as the associated data A, and the number 458 as the number N (also known as a nonce). The second device 404 may obtain, as output from the inverse function 455', the plaintext P when the authentication-encrypted NDEF record 452' is authenticated and decrypted. However, if the input tag T does not correspond to the input ciphertext C or associated data A, then the second device 404 may refrain from obtaining the plaintext P—for example, an error may be thrown.

When the authentication-encrypted NDEF record 452' is successfully authenticated and decrypted so that the second device 404 obtains the plaintext P, then the second device 404 may include the plaintext P as the unprotected NDEF record payload 456.

The second device 404 may repeat this process using the inverse function 455' for a set of authentication-encrypted NDEF records extracted from the authentication-encrypted NDEF message 460'. The second device 404 may then assemble the set of unprotected NDEF records, including the unprotected NDEF record 452 in an unprotected NDEF message 460. The second device 404 may provide the unprotected NDEF message 460 to a higher layer of the second device 404.

Figure 5:
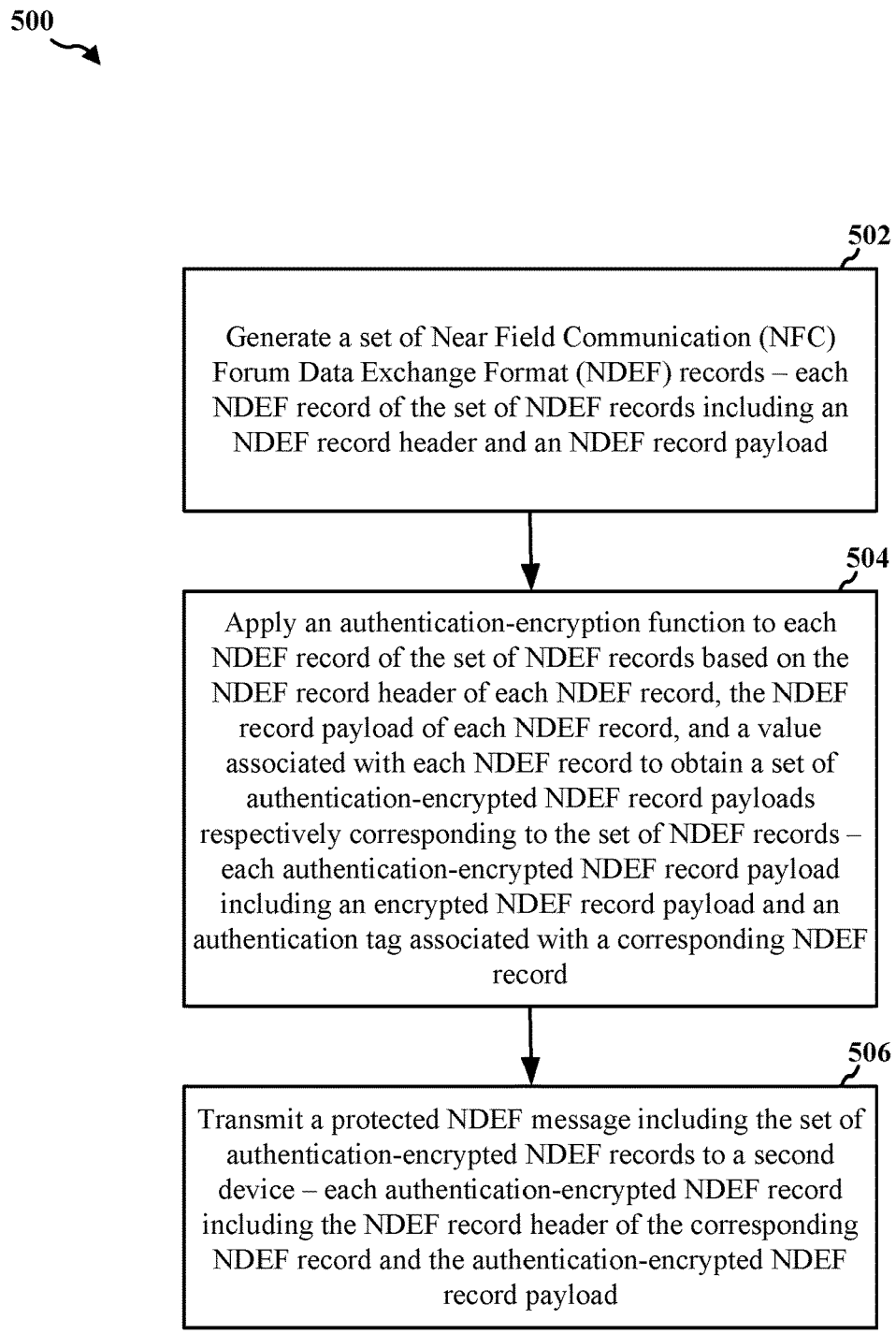
FIG. 5 illustrates a flowchart of a method of wireless communication.

FIG. 5 is a flowchart of a method 500 of wireless communication. The method may be performed by a first device (e.g., the initiator 104, the initiator 302, the first device 402, the apparatus 902/902', etc.). In FIG. 5, one or more operations may be omitted, transposed, and/or contemporaneously performed.

At 502, the first device may generate a set of NDEF records, and each NDEF record of the set of NDEF records may include an NDEF record header and an NDEF record payload. For example, the first device may generate an NDEF record, and the first device may identify data to be included in the NDEF record payload.

In the context of FIG. 4A, the first device 402 may generate an unprotected NDEF message 401. In certain aspects, the unprotected NDEF message 401 may include one of more NDEF records 403a, 403b that each include an NDEF record header 405 and an unencrypted NDEF record payload 407. In the context of FIGS. 4B-4C, the first device 402 may generate each unprotected NDEF record 452, which may respectively include an NDEF record header 454 and an NDEF record payload 456.

At 504, the first device may apply an authentication-encryption function to each NDEF record of the set of NDEF records based on the NDEF record header of each NDEF record, the NDEF record payload of each NDEF record, and a value associated with each NDEF record to obtain a set of authentication-encrypted NDEF record payloads respectively corresponding to the set of NDEF records. Each authentication-encrypted NDEF record payload may include an encrypted NDEF record payload and an authentication tag associated with a corresponding NDEF record. For example, for each authentication-encrypted NDEF record payload, the authentication tag may be appended to the encrypted NDEF record payload.

In some aspects, the value associated with each NDEF record comprises one of a nonce associated with the corresponding NDEF record or a numerical position of the corresponding NDEF record in the NDEF message. In other aspects, the value associated with each NDEF record is derived from one of a nonce associated with the corresponding NDEF record or a numerical position of the corresponding NDEF record in the NDEF message.

For example, the authentication-encryption function may receive an NDEF record header of an NDEF record, an NDEF record payload of the NDEF record, and a value associated with the NDEF record as inputs, and the authentication-encryption function may output an encrypted NDEF record payload of an authentication-encrypted NDEF record based on the NDEF record payload and may output an authentication tag of the authentication-encrypted NDEF record based on the NDEF record header and the value associated with the NDEF record.

In some aspects, the first device may extract each NDEF record of the set of NDEF records from an unprotected NDEF message before the applying the authentication-encryption function to each NDEF record of the set of NDEF records. Further, the first device may assemble the set of authentication-encrypted NDEF records in a protected NDEF message after the applying the authentication-encryption function to each NDEF record of the set of NDEF records.

In the context of FIG. 4A, the first device 402 may apply an authentication-encryption function to the unprotected NDEF message 401 by applying a protection algorithm 409. For example, the first device 402 may extract each unprotected NDEF record 403a, 403b (e.g., including a plain text payload) from the unprotected NDEF message 401. Upon extraction, the first device 402 may apply the protection algorithm 409 to each unprotected NDEF record 403a, 403b to provide for authenticated encryption of the NDEF records 403a, 403b. For encryption, the protection algorithm 409 may include an encryption algorithm to at least partially generate a protected NDEF message 417. In the context of FIGS. 4B-4C, the first device 402 may apply an authentication-encryption function 455 to the unprotected NDEF record 452. For example, the first device 402 may input, to the function 455, the unprotected NDEF record payload 456 as the plaintext P, the NDEF record header 454 as the associated data A, and the number 458 as the number N (also known as a nonce). The first device 402 may obtain, as outputs from the function 455, a ciphertext C and an authentication tag T. The first device 402 may generate an authentication-encrypted NDEF record 452' with the NDEF record header 454 and the ciphertext C as the authentication-encrypted NDEF record payload 456'. The tag T may be appended to or included in the authentication-encrypted NDEF record payload 456'.

At 506, the first device may transmit a protected NDEF message including the set of authentication-encrypted NDEF records to a second device, and each authentication-encrypted NDEF record may include the NDEF record header of the corresponding NDEF record and the authentication-encrypted NDEF record payload. The first device may transmit the protected NDEF message to the second device over an NFC link.

In the context of FIG. 4A, the first device 402 may assemble the one or more NDEF records 415a, 415b that each include the encrypted NDEF record payload 413 and tag 408 with the associated NDEF record header 411 to generate an authenticated-encrypted (e.g., "protected") NDEF message 417. Upon authentication encryption, the first device 402 may transmit the protected NDEF message 417 to the second device 404 using short-range communication, such as NFC. In the context of FIGS. 4B-4C, the first device 402 may assemble a set of authentication-encrypted NDEF records, including the authentication-encrypted NDEF record 452' in an authentication-encrypted (e.g., "protected") NDEF message 460'. The first device 402 may transmit the authentication-encrypted NDEF message 460' over an NFC link to the second device 404.

Figure 6:
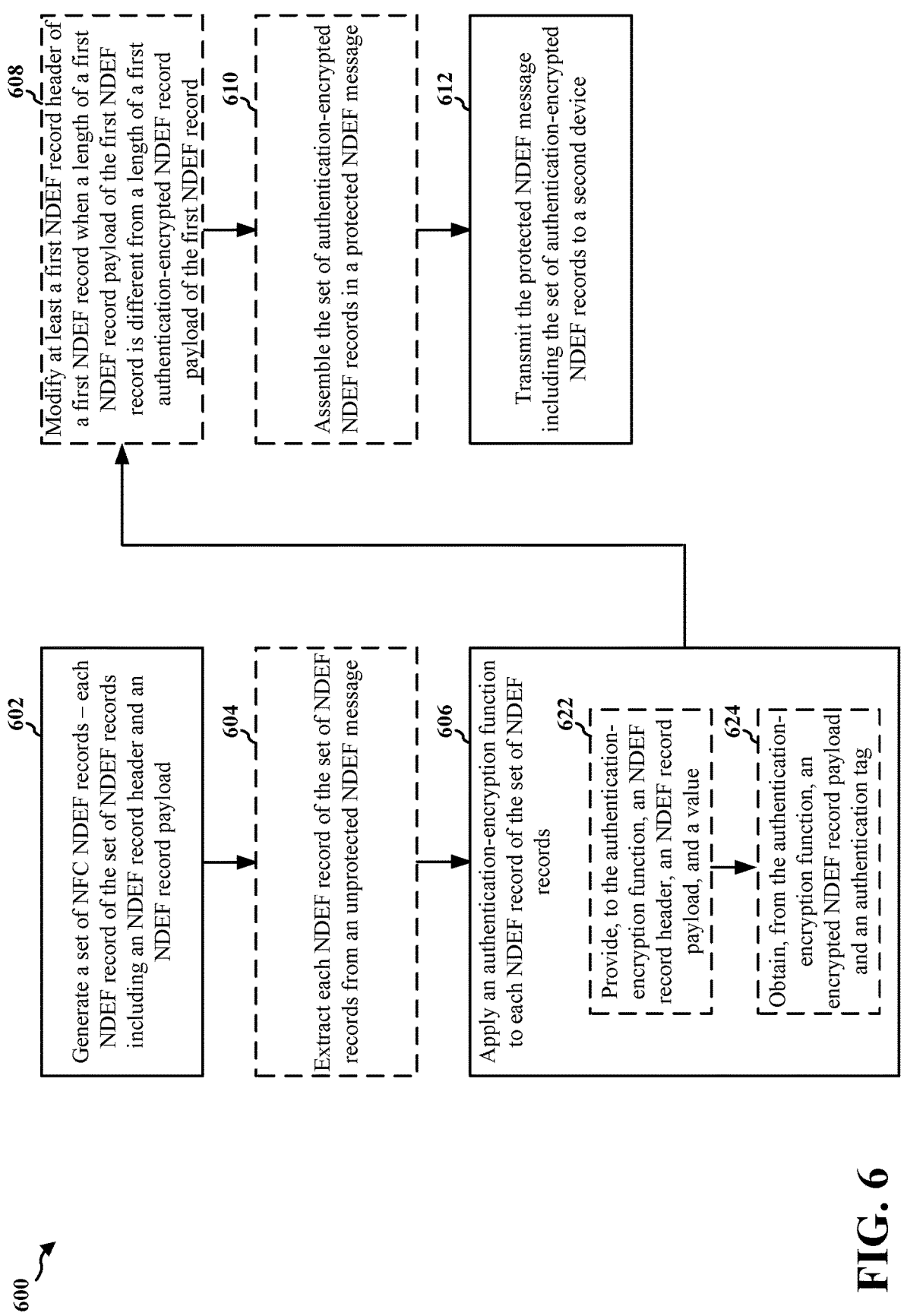
FIG. 6 illustrates a flowchart of a method of wireless communication.

FIG. 6 is a flowchart of a method 600 of wireless communication. The method 600 may be performed by a first device (e.g., the initiator 104, the initiator 302, the first device 402, the apparatus 902/902', etc.). In FIG. 6, one or more operations may be omitted, transposed, and/or contemporaneously performed.

At 602, the first device may generate a set of NFC NDEF records. Each NDEF record of the set of NDEF records may include an NDEF record header and an NDEF record payload. For example, the first device may identify data to be sent over an NFC link. The first device may generate the set of NFC NDEF records, and the first device may include at least a portion of the data in each NDEF record payload. In the context of FIG. 4A, the first device 402 may generate an unprotected NDEF message 401. In certain aspects, the unprotected NDEF message 401 may include one of more NDEF records 403*a*, 403*b* that each include an NDEF record header 405 and an unencrypted NDEF record payload 407.

At 604, the first device extract each NDEF record of the set of NDEF records from an unprotected NDEF message. For example, the first device may separate the unprotected NDEF message into a set of NDEF records, and the first device may select a first NDEF record of the set of NDEF records.

In the context of FIG. 4A, the first device 402 may extract each unprotected NDEF record 403*a*, 403*b* (e.g., including a plain text payload) from the unprotected NDEF message 401. In the context of FIGS. 4B-4C, the first device 402 may extract each unprotected NDEF record 452 from the unprotected NDEF message 460.

At 606, the first device may apply an authentication-encryption function to each NDEF record of the set of NDEF records. The first device may apply the authentication-encryption function to each NDEF record of the set of NDEF records based on a respective NDEF record header of a respective NDEF record, based on a respective NDEF record payload of the respective NDEF record, and based on a value associated with the respective NDEF record. In one aspect, the value associated with each NDEF record may be one of a nonce associated with the corresponding NDEF record or a numerical position of the corresponding NDEF record in the NDEF message. In one aspect, the value associated with each NDEF record may be derived from one of a nonce associated with the corresponding NDEF record or a numerical position of the corresponding NDEF record in the NDEF message.

In applying the authentication-encryption function to each NDEF record of the set of NDEF records, the first device may obtain a set of authentication-encrypted NDEF record payloads respectively corresponding to the set of NDEF records. Each authentication-encrypted NDEF record payload may include an encrypted NDEF record payload and an authentication tag associated with a corresponding NDEF record. In one aspect, for each authentication-encrypted NDEF record payload, the authentication tag may be appended to the encrypted NDEF record payload.

In the context of FIG. 4A, the first device 402 may apply the protection algorithm 409 to each unprotected NDEF record 403*a*, 403*b* based on the NDEF record header 405, the unprotected NDEF record payload 407, and the value 406. In the context of FIGS. 4B-4C, the first device 402 may apply the protection function 455 to the unprotected NDEF record 452 based on the NDEF record header 454, the unprotected NDEF record payload 456, and the number 458.

In one aspect of 606, the first device may apply the authentication-encryption function by, at 622, providing, to the authentication encryption function, as NDEF record header, an NDEF record payload, and a value. In the context of FIG. 4A, the first device 402 may provide, to the protection algorithm 409 for each unprotected NDEF record 403*a*, 403*b*, the NDEF record header 405, the unprotected NDEF record payload 407, and the value 406, as shown at 622. In the context of FIGS. 4B-4C, the first device 402 may provide, to the protection function 455, the NDEF record header 454, the unprotected NDEF record payload 456, and the number 458.

Further to 606, at 624, the first device may obtain, from the authentication-encryption function, an encrypted NDEF record payload of an authentication-encrypted NDEF record based on the NDEF record payload and, further, obtain the authentication tag based on the NDEF record header and the value associated with the NDEF record. In the context of FIG. 4A, the first device 402 may obtain, from the protection algorithm 409, the encrypted NDEF record payload 413 based on the unencrypted record payload 407, and may obtain, from the protection algorithm 409, the tag 408 based on the NDEF record header 405 and the value 406. In the context of FIGS. 4B-4C, the first device 402 may obtain, from the protection function 455, the authentication-encrypted NDEF record payload 456' based on the unprotected NDEF record payload 456, and obtain the tag T based on the NDEF record header 454 and the number 458.

At 608, the first device may modify at least a first NDEF record header of a first NDEF record of the set of NDEF records when a length of a first NDEF record payload of the first NDEF record is different from a length of a first authentication-encrypted NDEF record payload of the first NDEF record based on the application of the authentication-encryption function to each NDEF record of the set of NDEF records. In the context of FIG. 4A, the first device 402 may modify the associated NDEF record header 411 based on the protection algorithm 409. For example, the first device 402 may modify the initial length included in the initial NDEF record header 405 to correspond to the modified length of the encrypted NDEF record payload 413 (e.g., absent the tag 408, even though the tag 408 may be included in the field of the encrypted NDEF record payload 413). In the context of FIGS. 4B-4C, the first device 402 may modify an initial length included in the NDEF record header 454 to correspond to the modified length of the authentication-encrypted NDEF record payload 456' (e.g., absent the tag T).

At 610, the first device may assembly the set of authentication-encrypted NDEF records in a protected NDEF message. For example, the first device may generate a protected NDEF message, and the first device may include each authentication-encrypted NDEF record of the set of authentication-encrypted NDEF records in the protected NDEF message. In the context of FIG. 4A, the first device 402 may assembly the protected NDEF records 415*a*, 415*b* in the protected NDEF message 417. In the context of FIGS. 4B-4C, the first device 402 may assembly each authentication-encrypted NDEF record 452' in the protected NDEF message 460'.

At 612, the first device may transmit the protected NDEF message including the set of authentication-encrypted NDEF records to a second device. In one aspect, the protected NDEF message may be transmitted to the second device via an NFC link. In the context of FIG. 4A, the first device 402 may transmit, to the second device 404, the protected NDEF message 417 including the protected NDEF records 415*a*, 415*b*. In the context of FIGS. 4B-4C, the first device 402 may transmit, to the second device 404, the protected NDEF message 460' including each authentication-encrypted NDEF record 452'.

Figure 7:
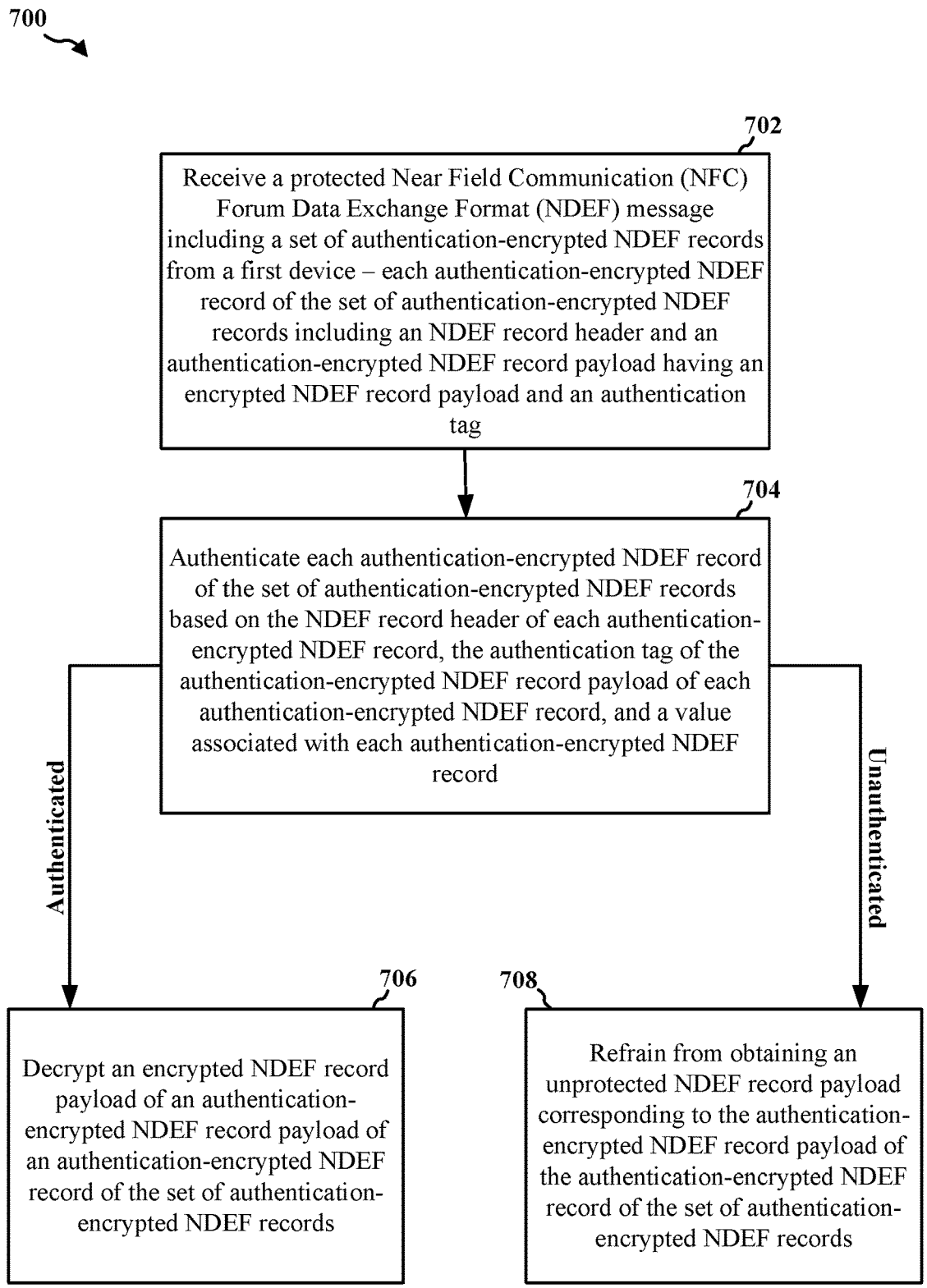
FIG. 7 illustrates a flowchart of a method of wireless communication.

FIG. 7 is a flowchart of a method 700 of wireless communication. The method 700 may be performed by a second device (e.g., the target 108, the target 304, the second device 404, the apparatus 1102/1102', etc.). In FIG. 7, one or more operations may be omitted, transposed, and/or contemporaneously performed.

At 702, the second device may receive a protected NDEF message including a set of authentication-encrypted NDEF records from a first device. Each authentication-encrypted NDEF record of the set of authentication-encrypted NDEF records may include an NDEF record header and an authentication-encrypted NDEF record payload having an encrypted NDEF record payload and an authentication tag. For example, the second device may receive the protected NDEF message over an NFC link from the first device. In some aspects, for each authentication-encrypted NDEF record payload, the authentication tag is appended to the encrypted NDEF record payload.

In the context of FIG. 4A, the second device 404 may receive the protected NDEF message 417. The protected NDEF message 417 may include the protected NDEF records 415a, 415b. In the context of FIGS. 4B-4C, the second device 404 may receive the protected NDEF message 460', which may include a set of authentication-encrypted NDEF records. A respective authentication-encrypted NDEF record 452' may include the NDEF record header 454 and the authentication-encrypted NDEF record payload 456'.

At 704, the second device may authenticate each authentication-encrypted NDEF record of the set of authentication-encrypted NDEF records based on the NDEF record header of each authentication-encrypted NDEF record, the authentication tag of the authentication-encrypted NDEF record payload of each authentication-encrypted NDEF record, and a value associated with each authentication-encrypted NDEF record.

In some aspects, for each authentication-encrypted NDEF record, the value associated with an authentication-encrypted NDEF record comprises one of a nonce associated with the authentication-encrypted NDEF record or a numerical position of the authentication-encrypted NDEF record in the protected NDEF message. In other aspects, for each authentication-encrypted NDEF record, the value associated with an authentication-encrypted NDEF record is derived from one of a nonce associated with the authentication-encrypted NDEF record or a numerical position of the authentication-encrypted NDEF record in the protected NDEF message.

In one example of 704, the authentication of each authentication-encrypted NDEF record of the set of authentication-encrypted NDEF records may include generating, for each authentication-encrypted NDEF record of the set of authentication-encrypted NDEF records, an expected tag based on an NDEF record header of an authentication-encrypted NDEF record and a value associated with the authentication-encrypted NDEF record and, further, comparing the expected tag with an authentication tag of the authentication-encrypted NDEF record payload of the authentication-encrypted NDEF record. Accordingly, the authentication-encrypted NDEF record is authenticated when the expected tag matches the authentication tag, and the authentication-encrypted NDEF record is unauthenticated when the expected tag is different from the authentication tag.

In the context of FIG. 4A, the second device 404 may authenticate each protected NDEF record 415a, 415b. In certain aspects, the second device 404 may use the tag 408 to check the authenticity of the protected NDEF records 415a, 415b, including the authenticity of both the NDEF record header 411 and the encrypted NDEF record payload 413. In the context of FIGS. 4B-4C, the second device 404 may authenticate each authentication-encrypted NDEF record payload 456'. For example, the second device 404 may input, to the inverse function 455', the authentication-encrypted NDEF record payload 456' as the ciphertext C and tag T, the NDEF record header 454 as the associated data A, and the number 458 as the number N (also known as a nonce). The second device 404 may obtain, as output from the inverse function 455', the plaintext P when the authentication-encrypted NDEF record 452' is authenticated and decrypted. However, if the input tag T does not correspond to the input ciphertext C or associated data A, then an error may be thrown.

If an authentication-encrypted NDEF record is authenticated then, at 706, the second device may decrypt an encrypted NDEF record payload of an authentication-encrypted NDEF record payload of an authentication-encrypted NDEF record of the set of authentication-encrypted NDEF records when the authentication-encrypted NDEF record is authenticated.

In some aspects, the second device may extract each authentication-encrypted NDEF record from the protected NDEF message before the authenticating each authentication-encrypted NDEF record of the set of authentication-encrypted NDEF records. The second device may then obtain an unprotected NDEF record for each authentication-encrypted NDEF record based on the NDEF record header of each authentication-encrypted NDEF record and the decrypted NDEF record payload. Next, the second device may assemble each unprotected NDEF record in an unprotected NDEF message.

In the context of FIG. 4A, if the second device 404 authenticates the respective one of the protected NDEF records 415a, 415b, the second device 404 may proceed in applying the inverse protection algorithm 409' to decrypt the encrypted NDEF record payload 413. Accordingly, the second device 404 may obtain each of the unprotected NDEF records 403a, 403b. In the context of FIGS. 4B-4C, the second device 404 may input, to the inverse function 455', the authentication-encrypted NDEF record payload 456' as the ciphertext C and tag T, the NDEF record header 454 as the associated data A, and the number 458 as the number N (also known as a nonce). The second device 404 may obtain, as output from the inverse function 455', the plaintext P when the authentication-encrypted NDEF record 452' is authenticated and decrypted. When the authentication-encrypted NDEF record 452' is successfully authenticated and decrypted so that the second device 404 obtains the plaintext P, then the second device 404 may include the plaintext P as the unprotected NDEF record payload 456.

If an authentication-encrypted NDEF record is unauthenticated then, at 708, the second device may refrain from obtaining an unprotected NDEF record payload corresponding to the authentication-encrypted NDEF record payload of the authentication-encrypted NDEF record of the set of authentication-encrypted NDEF records. For example, when the authentication-encrypted NDEF record is unauthenticated, the second device may refrain from providing the encrypted NDEF record payload to an inverse protection algorithm configured to decrypt encrypted NDEF record payloads, and the second device may discard the encrypted NDEF record payload, such as by discarding the authentication-encrypted NDEF record of the set of authentication-encrypted NDEF records.

According to other examples, if the second device determines an NDEF record is unauthenticated, the second device may indicate a failure of the NDEF message to an application expecting the unprotected NDEF message, such as by removing each NDEF record payload of each protected NDEF record that is unauthenticated and setting a length field of each NDEF record header of each protected NDEF record that is unauthenticated to zero. In another example, if the second device determines an NDEF record is unauthenticated, the second device may replace the NDEF record payload with an indication (e.g., code) that indicates the NDEF record is unauthenticated. In still another example, if the second device determines an NDEF record is unauthenticated, the second device may determine the entire NDEF message is unauthenticated (e.g., corrupted).

In the context of FIG. 4A, the second device 404 may refrain from obtaining the unprotected NDEF record payload 407 corresponding to the encrypted NDEF record payload 413 of a respective one of protected NDEF records 415a, 415b based on application of the inverse protection algorithm 409'. In the context of FIGS. 4B-4C, the second device 404 may refrain from obtaining the unprotected NDEF record payload 456 corresponding to the authentication-encrypted NDEF record payload 456' if the second device 404 is unable to authenticate the authentication-encrypted NDEF record 452' based on application of the inverse protection function 455'.

Figure 8A:
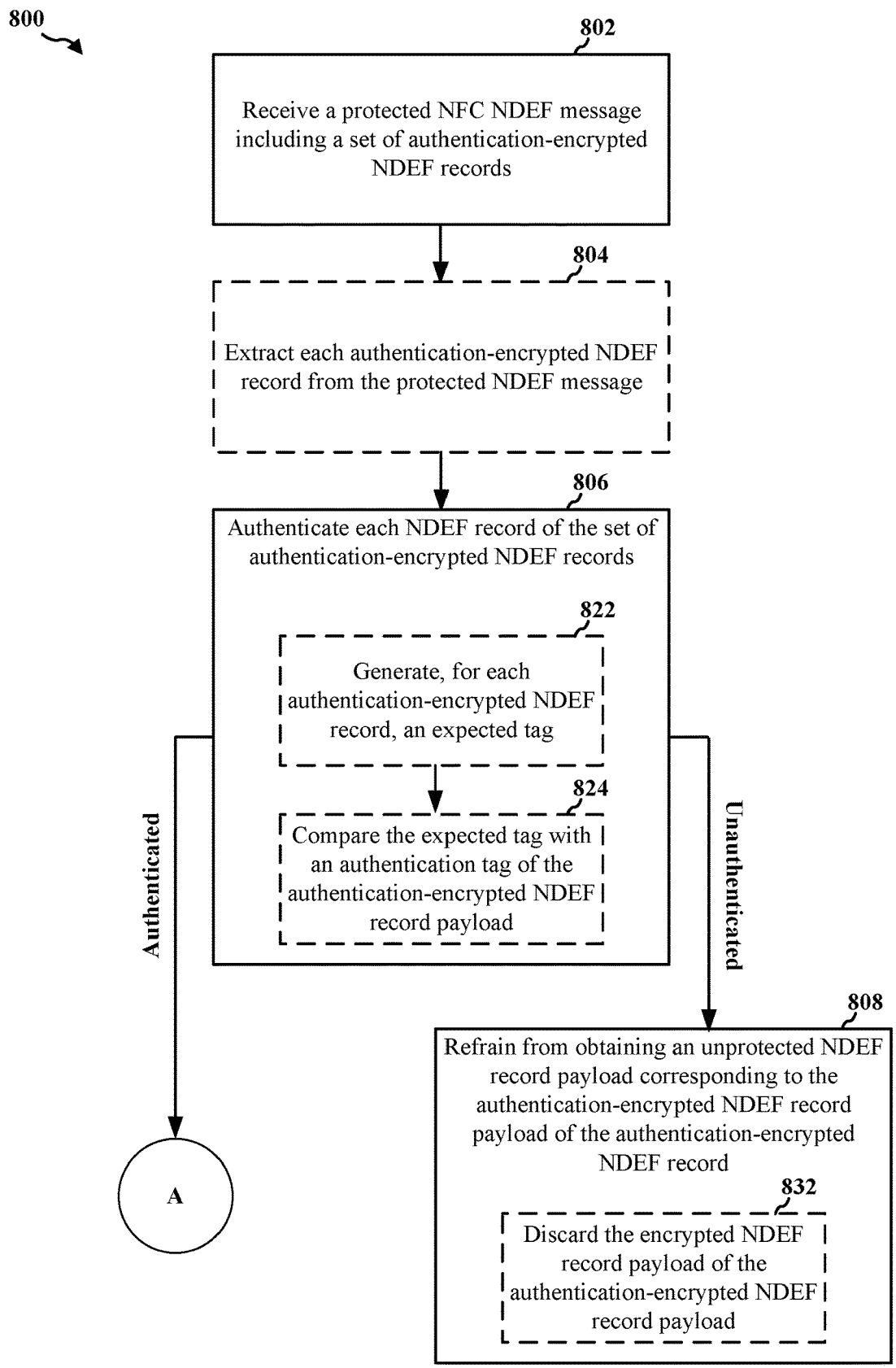
FIGS. 8A and 8B illustrate a flowchart of a method of wireless communication.
Figure 8B:
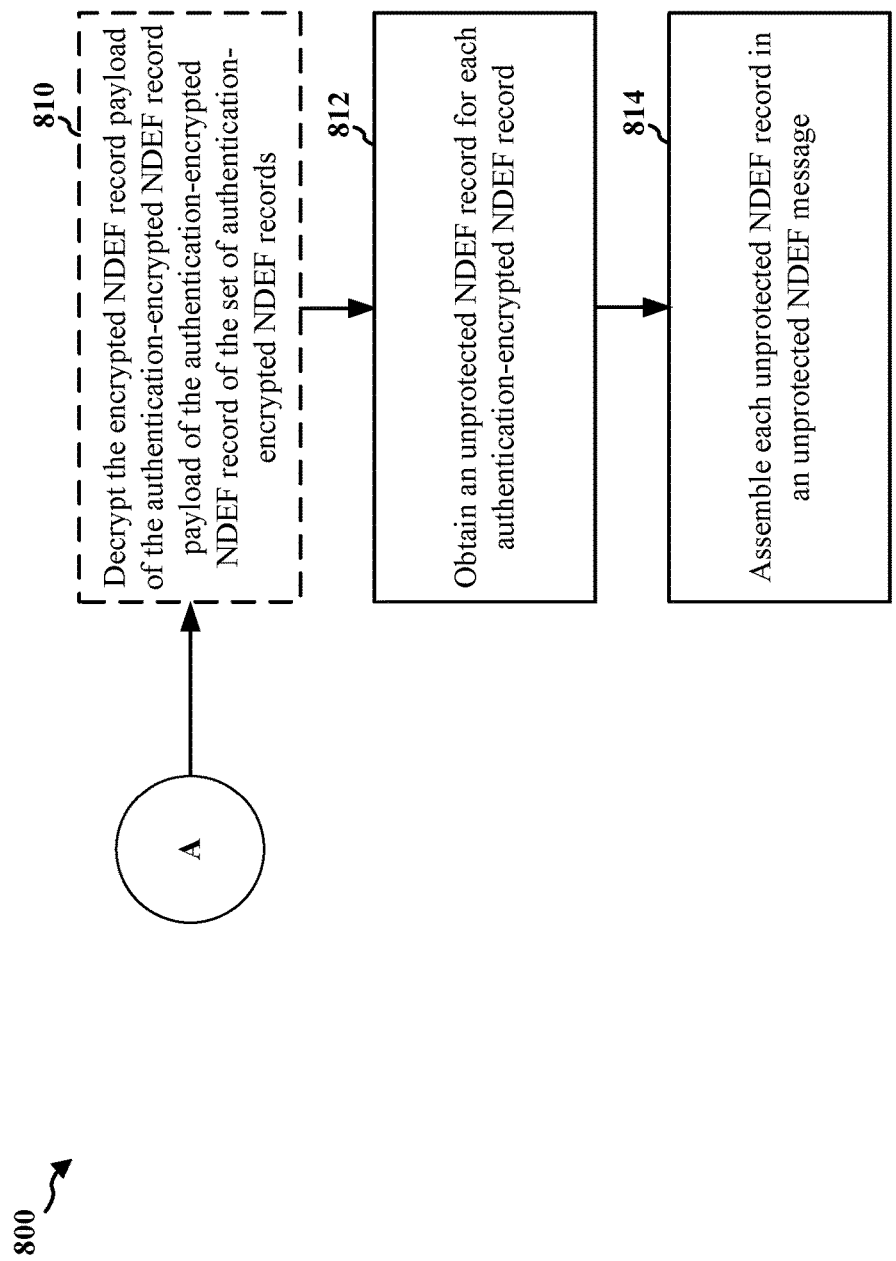

FIGS. 8A and 8B illustrate a flowchart of a method 800 of wireless communication.

The method 800 may be performed by a second device (e.g., the target 108, the target 304, the second device 404, the apparatus 1102/1102', etc.). In FIGS. 8A and 8B, one or more operations may be omitted, transposed, and/or contemporaneously performed.

At 802, the second device may receive a protected NDEF message including a set of authentication-encrypted NDEF records from a first device. Each authentication-encrypted NDEF record of the set of authentication-encrypted NDEF records may include an NDEF record header and an authentication-encrypted NDEF record payload having an encrypted NDEF record payload and an authentication tag. For example, the second device may receive the protected NDEF message over an NFC link from the first device. In some aspects, for each authentication-encrypted NDEF record payload, the authentication tag is appended to the encrypted NDEF record payload.

In the context of FIG. 4A, the second device 404 may receive the protected NDEF message 417. The protected NDEF message 417 may include the protected NDEF records 415a, 415b. In the context of FIGS. 4B-4C, the second device 404 may receive the protected NDEF message 460', which may include a set of authentication-encrypted NDEF records. A respective authentication-encrypted NDEF record 452' may include the NDEF record header 454 and the authentication-encrypted NDEF record payload 456'.

At 804, the second device may extract each authentication-encrypted NDEF record from the protected NDEF message. For example, the second device may identify a first authentication-encrypted NDEF record from the protected NDEF message, and the second device may store (e.g., buffer) the first authentication-encrypted NDEF record for access by the second device. In the context of FIG. 4A, the second device 404 may extract each protected NDEF record 415a, 415b from the protected NDEF message 417. In the context of FIGS. 4B-4C, the second device may extracted, from the protected NDEF message 460', each authentication-encrypted NDEF record 452'.

At 806, the second device may authenticate each authentication-encrypted NDEF record of the set of authentication-encrypted NDEF records based on the NDEF record header of each authentication-encrypted NDEF record, the authentication tag of the authentication-encrypted NDEF record payload of each authentication-encrypted NDEF record, and a value associated with each authentication-encrypted NDEF record. In one aspect, for each authentication-encrypted NDEF record payload, the authentication tag may be appended to the encrypted NDEF record payload. In one aspect, for each authentication-encrypted NDEF record, the value associated with an authentication-encrypted NDEF record may be one of a nonce associated with the authentication-encrypted NDEF record or a numerical position of the authentication-encrypted NDEF record in the protected NDEF message. In one aspect, for each authentication-encrypted NDEF record, the value associated with an authentication-encrypted NDEF record may be derived from one of a nonce associated with the authentication-encrypted NDEF record or a numerical position of the authentication-encrypted NDEF record in the protected NDEF message.

In the context of FIG. 4A, the second device 404 may authenticate each protected NDEF record 415a, 415b. In certain aspects, the second device 404 may use the tag 408 to check the authenticity of the protected NDEF records 415a, 415b, including the authenticity of both the NDEF record header 411 and the encrypted NDEF record payload 413. In the context of FIGS. 4B-4C, the second device 404 may authenticate each authentication-encrypted NDEF record payload 456'. For example, the second device 404 may input, to the inverse function 455', the authentication-encrypted NDEF record payload 456' as the ciphertext C and tag T, the NDEF record header 454 as the associated data A, and the number 458 as the number N (also known as a nonce). The second device 404 may obtain, as output from the inverse function 455', the plaintext P when the authentication-encrypted NDEF record 452' is authenticated and decrypted. However, if the input tag T does not correspond to the input ciphertext C or associated data A, then an error may be thrown.

In one aspect of 806, the second device may authenticate each NDEF record of the set of authentication-encrypted NDEF records by, at 822, generating, for each authentication-encrypted NDEF record an expected tag. In the context of FIG. 4A, the second device 404 may authenticate each protected NDEF record 415a, 415b by generating an expected tag 408'. In the context of FIGS. 4B-4C, the second device 404 may authenticate each authentication-encrypted NDEF record 452' by generating an expected tag expected to match the tag T.

Further to 806, at 824, the second device may compare the expected tag with an authentication tag of the authentication-encrypted NDEF record payload of the authentication-encrypted NDEF record. The second device may authenticate the authentication-encrypted NDEF record when the expected tag matches the authentication tag, and the second device may determine the authentication-encrypted NDEF record is unauthenticated when the expected tag does not match the authentication tag. In the context of FIG. 4A, the second device 404 may compare the expected tag 408' with the tag 408 included in a respective one of the protected NDEF records 415a, 415b. If the expected tag 408' matches the tag 408 (e.g., if the checksums are equal), then the second device 404 has authenticated the respective one of the protected NDEF records 415a, 415b. If the second device 404 authenticates the respective one of the protected NDEF records 415a, 415b, the second device 404 may proceed in applying the inverse protection algorithm 409' to decrypt the encrypted NDEF record payload 413. If, however, the expected tag 408' does not match the tag 408 (e.g., if the checksums are unequal), then the second device 404 has determined the respective one of the protected NDEF records 415*a*, 415*b* is unauthenticated. In the context of FIGS. 4B-4C, the second device 404 may compare the expected tag generated for the authentication-encrypted NDEF record 452' to the tag T of the authentication-encrypted NDEF record 452'. If the expected tag matches the tag T, then the second device 404 has authenticated the authentication-encrypted NDEF record 452'. If the expected tag does not match the tag T, then the second device 404 has determined the authentication-encrypted NDEF record 452' is unauthenticated.

If the authentication-encrypted NDEF record is unauthenticated, at 808, the second device may refrain from obtaining an unprotected NDEF record payload corresponding to the authentication-encrypted NDEF record payload of the authentication-encrypted NDEF record of the set of authentication-encrypted NDEF records. For example, the second device may discard the authentication-encrypted NDEF record. In another example, the second device 404 may indicate a failure of the unprotected NDEF message to an application expecting the unprotected NDEF message, such as by removing an NDEF record payload of the authentication-encrypted NDEF record and setting a length field of the NDEF record header of the authentication-encrypted NDEF record to zero.

In the context of FIG. 4A, the second device 404 may refrain from obtaining the unprotected NDEF record payload 407 corresponding to the encrypted NDEF record payload 413 of a respective one of protected NDEF records 415*a*, 415*b* based on application of the inverse protection algorithm 409'. In the context of FIGS. 4B-4C, the second device 404 may refrain from obtaining the unprotected NDEF record payload 456 corresponding to the authentication-encrypted NDEF record payload 456' if the second device 404 is unable to authenticate the authentication-encrypted NDEF record 452' based on application of the inverse protection function 455'.

Referring to FIG. 8B, at 810, if the authentication-encrypted NDEF record is authenticated, then the second device may decrypt an encrypted NDEF record payload of the authentication-encrypted NDEF record payload of the authentication-encrypted NDEF record of the set of authentication-encrypted NDEF records. In the context of FIG. 4A, if the second device 404 authenticates the respective one of the protected NDEF records 415*a*, 415*b*, the second device 404 may proceed in applying the inverse protection algorithm 409' to decrypt the encrypted NDEF record payload 413. Accordingly, the second device 404 may obtain each of the unprotected NDEF records 403*a*, 403*b*. In the context of FIGS. 4B-4C, the second device 404 may input, to the inverse function 455', the authentication-encrypted NDEF record payload 456' as the ciphertext C and tag T, the NDEF record header 454 as the associated data A, and the number 458 as the number N (also known as a nonce). The second device 404 may obtain, as output from the inverse function 455', the plaintext P when the authentication-encrypted NDEF record 452' is authenticated and decrypted. When the authentication-encrypted NDEF record 452' is successfully authenticated and decrypted so that the second device 404 obtains the plaintext P, then the second device 404 may include the plaintext P as the unprotected NDEF record payload 456.

At 812, the second device may obtain an unprotected NDEF record for each authentication-encrypted NDEF record. For example, the second device may construct an unprotected NDEF record with the NDEF record header, and the second device may append to decrypted NDEF record payload to the NDEF record header to complete the unprotected NDEF record. In the context of FIG. 4A, the second device 404 may obtain each of the unprotected NDEF records 403*a*, 403*b*, which may include the NDEF record header 405 and the NDEF record payload 407. In the context of FIGS. 4B-4C, the second device 404 may obtain the unprotected NDEF record 452, which may include the NDEF record header 454 and the unprotected NDEF record payload 456.

At 814, the second device may assembly each unprotected NDEF record in an unprotected NDEF message. For example, the second device may determine a respective position of each unprotected NDEF record, and the second device may insert each unprotected NDEF record in the unprotected NDEF message at the respective position of each unprotected NDEF record. In the context of FIG. 4A, the second device 404 may assembly each of the unprotected NDEF records 403*a*, 403*b* in the unprotected NDEF message 401. In the context of FIGS. 4B-4B, the second device 404 may assembly the unprotected NDEF record 452 in the unprotected NDEF message 460.

Figure 9:
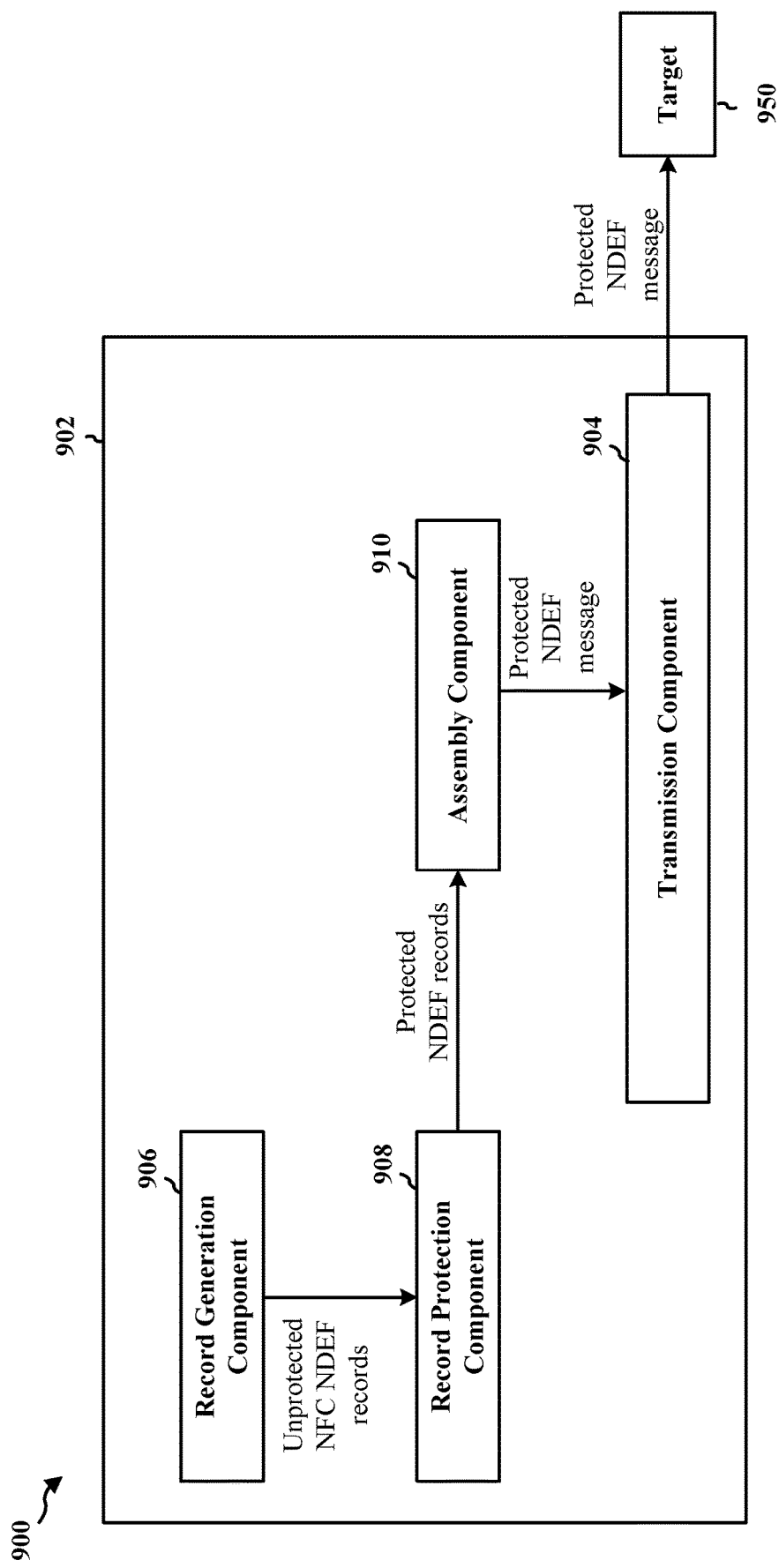
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus 902 may include a transmission component 904 configured to transmit signals to a target 950. The apparatus may include a record generation component 906, a record protection component 908, and an assembly component 910.

The record generation component 906 may generate a set of NDEF records. Each NDEF record of the set of NDEF records may include an NDEF record header and an NDEF record payload. The record generation component 906 may provide the set of NDEF records to the record protection component 908.

The record protection component 908 may apply an authentication-encryption function to each NDEF record of the set of NDEF records based on the NDEF record header of each NDEF record, the NDEF record payload of each NDEF record, and a value associated with each NDEF record. In one aspect, the record protection component 908 may extract each NDEF record of the set of NDEF records from an unprotected NDEF message before applying the authentication-encryption function to each NDEF record of the set of NDEF records.

In one aspect, the value associated with each NDEF record may be one of a nonce associated with the corresponding NDEF record or a numerical position of the corresponding NDEF record in the unprotected NDEF message. In one aspect, the value associated with each NDEF record may be derived from one of a nonce associated with the corresponding NDEF record or a numerical position of the corresponding NDEF record in the unprotected NDEF message.

In one aspect, the record protection component 908 may provide, to the authentication-encryption function as inputs, a respective NDEF record header of a respective NDEF record, a respective NDEF record payload of the respective NDEF record, and a respective value associated with the respective NDEF record. The record protection component 908 may obtain, from the authentication-encryption function, an encrypted NDEF record payload of an authentication-encrypted NDEF record based on the respective NDEF record payload, and obtain an authentication tag of the authentication-encrypted NDEF record based on the NDEF record header and the respective value associated with the respective NDEF record.

In one aspect, the record protection component 908 may modify at least a first NDEF record header of a first NDEF record of the set of NDEF records when a length of a first NDEF record payload of the first NDEF record is different from a length of a first authentication-encrypted NDEF record payload of the first NDEF record based on applying the authentication-encryption function to the first NDEF record of the set of NDEF records.

In applying the authentication-encryption function to each NDEF record of the set of NDEF records, the record protection component 908 may obtain a set of authentication-encrypted NDEF record payloads respectively corresponding to the set of NDEF records. Each authentication-encrypted NDEF payload may include an encrypted NDEF record payload and an authentication tag associated with the corresponding NDEF record. In one aspect, for each authentication-encrypted NDEF record payload, the record protection component 908 may append the respective authentication tag to the encrypted NDEF record payload.

The record protection component 908 may provide the set of authentication-encrypted NDEF records to an assembly component 910. The assembly component 910 may assemble the set of authentication-encrypted NDEF records in a protected NDEF message. The assembly component 910 may provide the protected NDEF message to the transmission component 904. The transmission component 904 may transmit the protected NDEF message to the target 950. In one aspect, the protected NDEF message is transmitted to the target 950 via an NFC link.

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
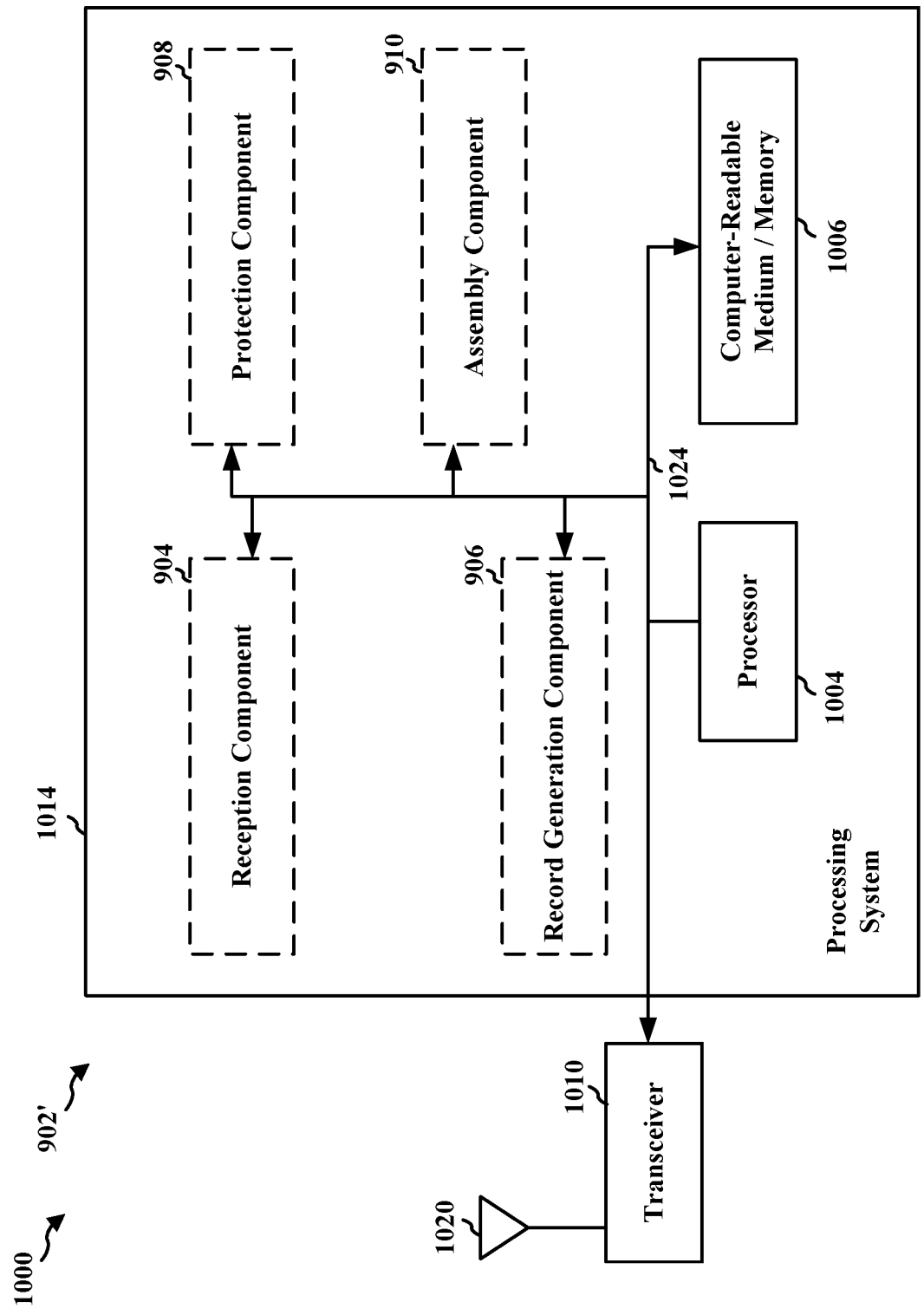
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014. In addition, the transceiver 1010 receives information from the processing system 1014, specifically the transmission component 904, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910. The components may be software components running in the processor 1004, resident/stored in the computer readable medium/memory 1006, one or more hardware components coupled to the processor 1004, or some combination thereof. The processing system 1014 may be a component of the initiator 104 and/or the initiator 302, and may include a memory and/or at least one of transmit (TX) processor and/or controller/processor. Alternatively, the processing system 1014 may be the entire initiator 104 and/or the entire initiator.

In one configuration, the apparatus 902/902' for wireless communication may include means for generating a set of NDEF records, each NDEF record of the set of NDEF records including an NDEF record header and an NDEF record payload. The apparatus 902/902' may include means for applying an authentication-encryption function to each NDEF record of the set of NDEF records based on the NDEF record header of each NDEF record, the NDEF record payload of each NDEF record, and a value associated with each NDEF record to obtain a set of authentication-encrypted NDEF record payloads respectively corresponding to the set of NDEF records, wherein each authentication-encrypted NDEF record payload includes an encrypted NDEF record payload and an authentication tag associated with a corresponding NDEF record. The apparatus 902/902' may include means for transmitting a protected NDEF message including the set of authentication-encrypted NDEF records to a second device, wherein each authentication-encrypted NDEF record includes the NDEF record header of the corresponding NDEF record and the authentication-encrypted NDEF record payload.

In an aspect, for each authentication-encrypted NDEF record payload, the authentication tag is appended to the encrypted NDEF record payload. The apparatus 902/902' may include means for extracting each NDEF record of the set of NDEF records from an unprotected NDEF message before the applying the authentication-encryption function to each NDEF record of the set of NDEF records; and means for assembling the set of authentication-encrypted NDEF records in the protected NDEF message after the applying the authentication-encryption function to each NDEF record of the set of NDEF records.

In one aspect, the value associated with each NDEF record comprises one of a nonce associated with the corresponding NDEF record or a numerical position of the corresponding NDEF record in the unprotected NDEF message. In one aspect, the value associated with each NDEF record is derived from one of a nonce associated with the corresponding NDEF record or a numerical position of the corresponding NDEF record in the unprotected NDEF message.

In one aspect, the means for applying an authentication-encryption function to each NDEF record of the set of NDEF records is configured to provide, to the authentication-encryption function as inputs, the NDEF record header of the NDEF record of the set of NDEF records, the NDEF record payload of the NDEF record, and the value associated with the NDEF record; and obtain, from the authentication-encryption function, the encrypted NDEF record payload and the authentication tag of the authentication-encrypted NDEF record of the set of authentication-encrypted NDEF records, the encrypted NDEF record payload being obtained based on the NDEF record payload and the authentication tag of the authentication-encrypted NDEF record being obtained based on the NDEF record header and the value associated with the NDEF record.

In one aspect, the protected NDEF message is transmitted to the second device via an NFC link. The apparatus 902/902' may include means for modifying at least a first NDEF record header of a first NDEF record of the set of NDEF records when a length of a first NDEF record payload of the first NDEF record is different from a length of a first authentication-encrypted NDEF record payload of the first NDEF record based on the applying the authentication-encryption function to each NDEF record of the set of NDEF records. The aforementioned means may be one or more of the aforementioned components of the apparatus 902 and/or the processing system 1014 of the apparatus 902' configured to perform the functions recited by the aforementioned means.

Figure 11:
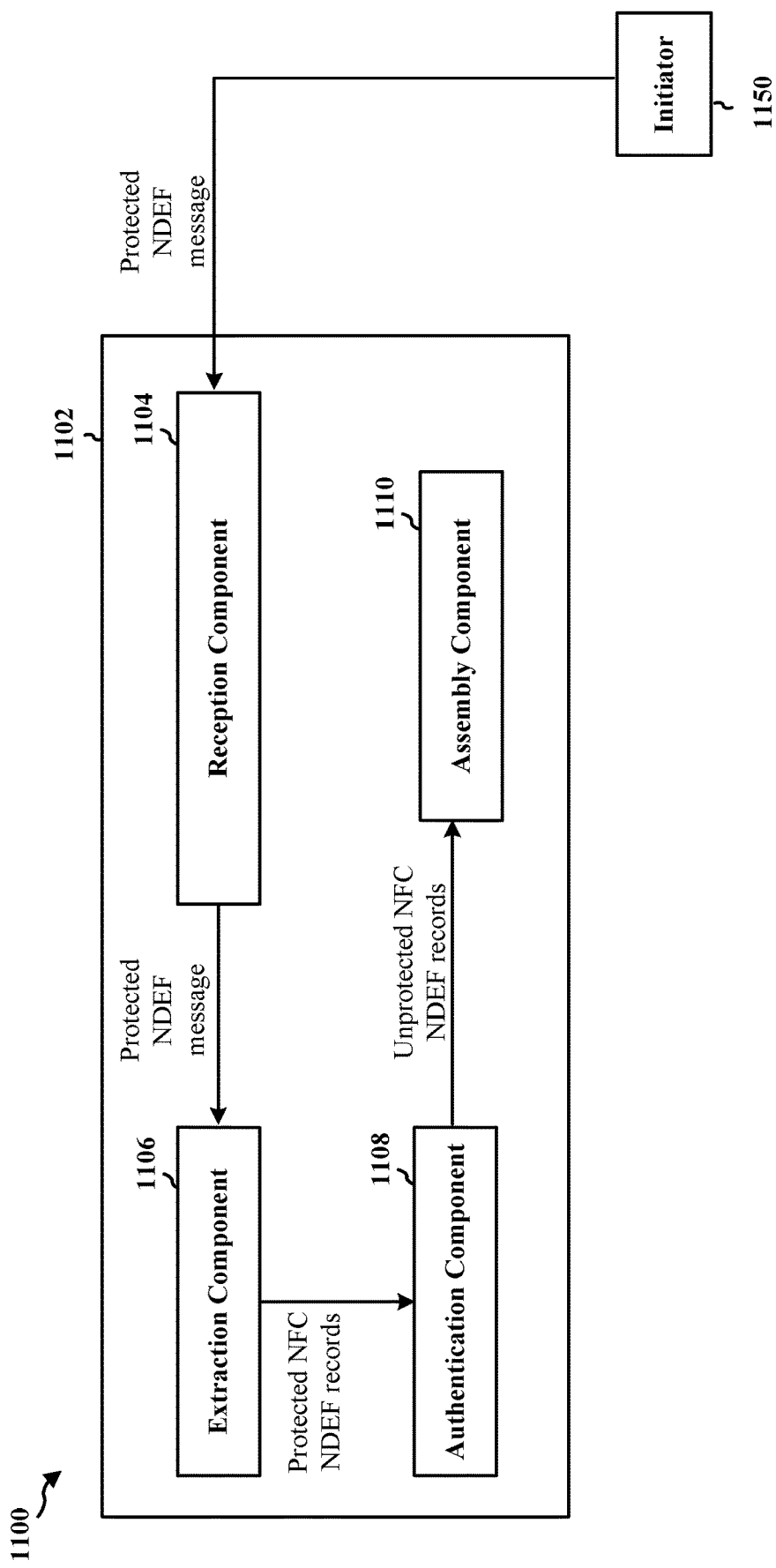
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a target. The apparatus 1102 includes a reception component 1104, an extraction component 1106, an authentication component 1108, and an assembly component 1110. The reception component 1104 may receive a protected NDEF message from an initiator 1150 via a short-range communications link, such as an NFC link. The protected NDEF message may include a set of authentication-encrypted NDEF records, and each authentication-encrypted NDEF record may include an NDEF record header and an authentication-encrypted NDEF record payload having an encrypted NDEF record payload and an authentication tag. In one aspect, for each authentication-encrypted NDEF record payload, the authentication tag is appended to the encrypted NDEF record payload.

The reception component 1104 may provide the protected NDEF message to the extraction component 1106. The extraction component 1106 may extract each authentication-encrypted NDEF record from the protected NDEF message. The extraction component 1106 may provide each extracted authentication-encrypted NDEF record to the authentication component 1108.

The authentication component 1108 may authenticate each authentication-encrypted NDEF record of the set of authentication-encrypted NDEF records based on the NDEF record header of each authentication-encrypted NDEF record, the authentication tag of the authentication-encrypted NDEF record payload of each authentication-encrypted NDEF record, and a value associated with each authentication-encrypted NDEF record.

In one aspect, the value associated with each NDEF record may be one of a nonce associated with the corresponding NDEF record or a numerical position of the corresponding NDEF record in the protected NDEF message. In one aspect, the value associated with each NDEF record may be derived from one of a nonce associated with the corresponding NDEF record or a numerical position of the corresponding NDEF record in the protected NDEF message.

In one aspect, the authentication component 1108 may authenticate each authentication-encrypted NDEF record of the set of authentication-encrypted NDEF records by first generating, for each authentication-encrypted NDEF record, an expected tag based on an NDEF record header of an authentication-encrypted NDEF record and a value associated with the authentication-encrypted NDEF record. The authentication component 1108 may compare the expected tag with the authentication tag of the authentication-encrypted NDEF record payload of the authentication-encrypted NDEF record. The authentication component 1108 may authenticate the authentication-encrypted NDEF record when the expected tag matches the authentication tag, and the authentication component 1108 may determine the authentication-encrypted NDEF record is unauthenticated when the expected tag does not match the authentication tag.

The authentication component 1108 may decrypt an encrypted NDEF record payload of the authentication-encrypted NDEF record payload of the authentication-encrypted NDEF record of the set of authentication-encrypted NDEF records when the authentication-encrypted NDEF message is authenticated. However, the authentication component 1108 may refrain from obtaining an unprotected NDEF record payload corresponding to the authentication-encrypted NDEF record payload of the authentication-encrypted NDEF record of the set of authentication-encrypted NDEF records when the authentication-encrypted NDEF record is unauthenticated. For example, the authentication component 1108 may discard the authentication-encrypted NDEF record payload of the authentication-encrypted NDEF record of the set of authentication-encrypted NDEF records when the authentication-encrypted NDEF record is unauthenticated.

The authentication component 1108 may obtain an unprotected NDEF record for each authentication-encrypted NDEF record based on the NDEF record header of each authentication-encrypted NDEF record and the decrypted NDEF record payload. The authentication component 1108 may provide the set of unprotected NDEF records to the assembly component 1110. The assembly component 1108 may assemble each unprotected NDEF record in an unprotected NDEF message.

The apparatus may include additional components that perform each of the blocks of the algorithm in the aforementioned flowcharts of FIGS. 7, 8A, and 8B. As such, each block in the aforementioned flowcharts of FIGS. 7, 8A, and 8B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
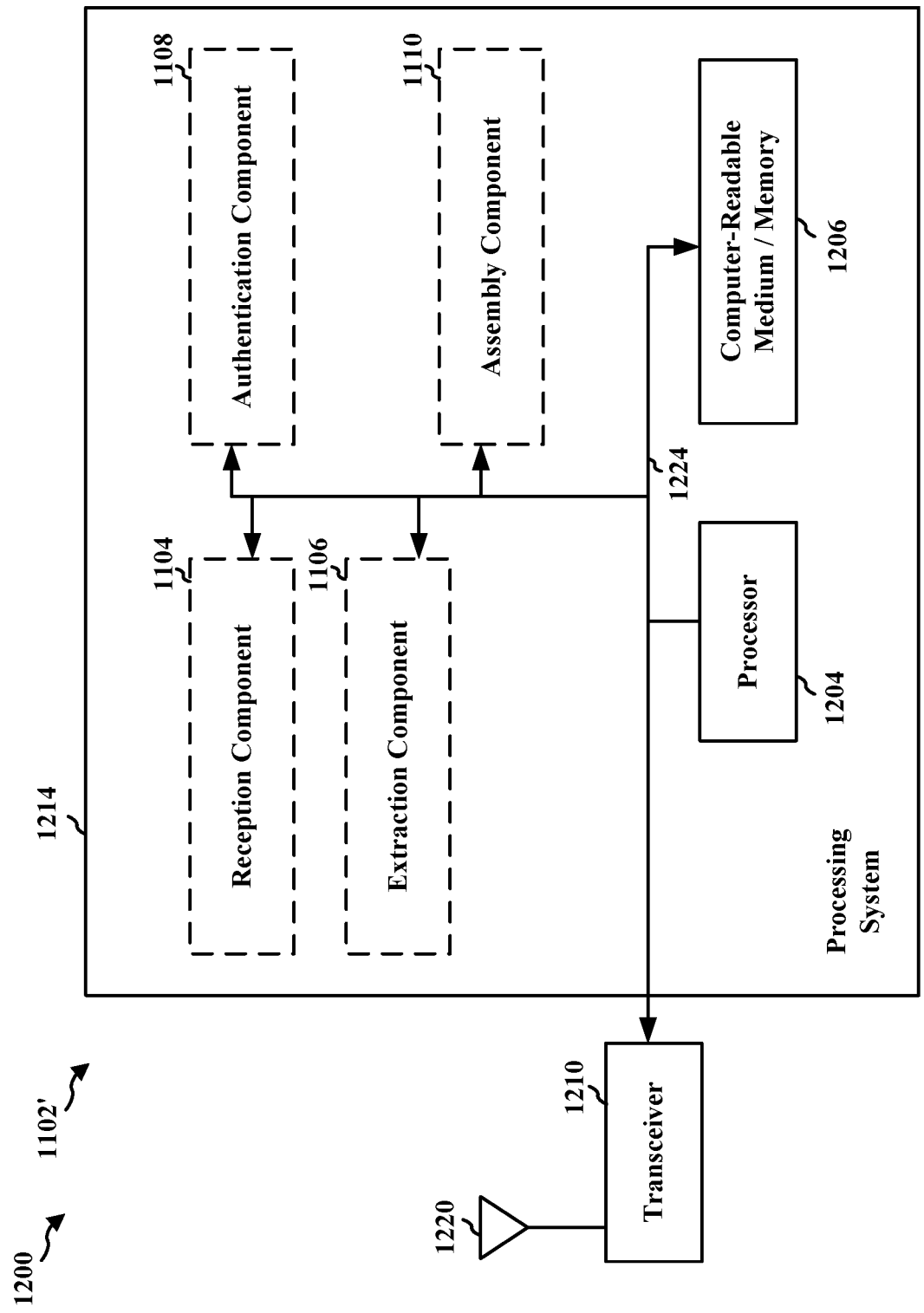
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214 and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof. The processing system 1214 may be a component of the target 108 and/or target 304 and may include memory and/or at least one a receive (RX) processor and/or a controller/processor. Alternatively, the processing system 1214 may be the entire target 108 and/or the entire target 304.

In one configuration, the apparatus 1102/1102' for wireless communication may include means for receiving a protected NDEF message including a set of authentication-encrypted NDEF records from a second device, each authentication-encrypted NDEF record of the set of authentication-encrypted NDEF records including an NDEF record header and an authentication-encrypted NDEF record payload having an encrypted NDEF record payload and an authentication tag. The apparatus 1102/1102' for wireless communication includes means for authenticating each authentication-encrypted NDEF record of the set of authentication-encrypted NDEF records based on the NDEF record header of each authentication-encrypted NDEF record, the authentication tag of the authentication-encrypted NDEF record payload of each authentication-encrypted NDEF record, and a value associated with each authentication-encrypted NDEF record. The apparatus 1102/1102' for wireless communication may include means for decrypting an encrypted NDEF record payload of an authentication-encrypted NDEF record payload of an authentication-encrypted NDEF record of the set of authentication-encrypted NDEF records when the authentication-encrypted NDEF record is authenticated. The apparatus 1102/1102' for wireless communication includes means for refraining from obtaining an unprotected NDEF record payload corresponding to the authentication-encrypted NDEF record payload of the authentication-encrypted NDEF record of the set of authentication-encrypted NDEF records when the authentication-encrypted NDEF record is unauthenticated.

In one aspect, for each authentication-encrypted NDEF record payload, the authentication tag is appended to the encrypted NDEF record payload. In one aspect, for each authentication-encrypted NDEF record, the value associated with an authentication-encrypted NDEF record comprises one of a nonce associated with the authentication-encrypted NDEF record or a numerical position of the authentication-encrypted NDEF record in the protected NDEF message. In one aspect, for each authentication-encrypted NDEF record, the value associated with an authentication-encrypted NDEF record is derived from one of a nonce associated with the authentication-encrypted NDEF record or a numerical position of the authentication-encrypted NDEF record in the protected NDEF message.

The apparatus 1102/1102' for wireless communication includes means for extracting each authentication-encrypted NDEF record from the protected NDEF message before the authenticating each authentication-encrypted NDEF record of the set of authentication-encrypted NDEF records; means for obtaining an unprotected NDEF record for each authentication-encrypted NDEF record based on the NDEF record header of each authentication-encrypted NDEF record and the decrypted NDEF record payload; and means for assembling each unprotected NDEF record in an unprotected NDEF message.

In one aspect, the means for authenticating each authentication-encrypted NDEF record of the set of authentication-encrypted NDEF records is configured to generate, for each authentication-encrypted NDEF record of the set of authentication-encrypted NDEF records, an expected tag based on the NDEF record header of the authentication-encrypted NDEF record and the value associated with the authentication-encrypted NDEF record; and compare the expected tag with the authentication tag of the authentication-encrypted NDEF record payload of the authentication-encrypted NDEF record, and the authentication-encrypted NDEF record is authenticated when the expected tag matches the authentication tag, and the authentication-encrypted NDEF record is unauthenticated when the expected tag is different from the authentication tag.

In one aspect, the protected NDEF message is received from the second device via an NFC link. In one aspect, the means for refraining from decrypting the encrypted NDEF record payload of the authentication-encrypted NDEF record payload of the authentication-encrypted NDEF record of the set of authentication-encrypted NDEF records when the authentication-encrypted NDEF record is unauthenticated is configured to discard the encrypted NDEF record payload of the authentication-encrypted NDEF record payload of the authentication-encrypted NDEF record of the set of authentication-encrypted NDEF records when the authentication-encrypted NDEF record is unauthenticated. The aforementioned means may be one or more of the aforementioned components of the apparatus 1102 and/or the processing system 1214 of the apparatus 1102' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of a wireless communication by a first device, the method comprising:
    generating a set of Near Field Communication (NFC) Forum Data Exchange Format (NDEF) records, each NDEF record of the set of NDEF records including an NDEF record header and an NDEF record payload;
    applying an authentication-encryption function to each NDEF record of the set of NDEF records based on the NDEF record header of each NDEF record, the NDEF record payload of each NDEF record, and a value associated with each NDEF record to obtain a set of authentication-encrypted NDEF record payloads respectively corresponding to the set of NDEF records, wherein each authentication-encrypted NDEF record payload includes an encrypted NDEF record payload and an authentication tag associated with a corresponding NDEF record, wherein there is no creation of a new NDEF record; and
    transmitting a protected NDEF message including the set of authentication-encrypted NDEF records to a second device, wherein each authentication-encrypted NDEF record includes the NDEF record header of the corresponding NDEF record and the authentication-encrypted NDEF record payload.

2. The method of claim 1, wherein for each authentication-encrypted NDEF record payload, the authentication tag is appended to the encrypted NDEF record payload.

3. The method of claim 1, further comprising:
    extracting each NDEF record of the set of NDEF records from an unprotected NDEF message before the applying the authentication-encryption function to each NDEF record of the set of NDEF records; and
    assembling the set of authentication-encrypted NDEF records in the protected NDEF message after the applying the authentication-encryption function to each NDEF record of the set of NDEF records.

4. The method of claim 3, wherein the value associated with each NDEF record comprises one of a nonce associated with the corresponding NDEF record or a numerical position of the corresponding NDEF record in the unprotected NDEF message.

5. The method of claim 3, wherein the value associated with each NDEF record is derived from one of a nonce associated with the corresponding NDEF record or a numerical position of the corresponding NDEF record in the unprotected NDEF message.

6. The method of claim 1, wherein the applying an authentication-encryption function to each NDEF record of the set of NDEF records comprises:
    providing, to the authentication-encryption function as inputs, the NDEF record header of the NDEF record of the set of NDEF records, the NDEF record payload of the NDEF record, and the value associated with the NDEF record;
    obtaining, from the authentication-encryption function, the encrypted NDEF record payload and the authentication tag of the authentication-encrypted NDEF record of the set of authentication-encrypted NDEF records, the encrypted NDEF record payload being obtained based on the NDEF record payload and the authentication tag of the authentication-encrypted NDEF record being obtained based on the NDEF record header and the value associated with the NDEF record.

7. The method of claim 1, wherein the protected NDEF message is transmitted to the second device via an NFC link.

8. The method of claim 1, further comprising:
    modifying at least a first NDEF record header of a first NDEF record of the set of NDEF records when a length of a first NDEF record payload of the first NDEF record is different from a length of a first authentication-encrypted NDEF record payload of the first NDEF record based on the applying the authentication-encryption function to each NDEF record of the set of NDEF records.

9. A method of a wireless communication by a first device, the method comprising:
    receiving a protected Near Field Communication (NFC) Forum Data Exchange Format (NDEF) message including a set of authentication-encrypted NDEF records from a second device, each authentication-encrypted NDEF record of the set of authentication-encrypted NDEF records including an NDEF record header and an authentication-encrypted NDEF record payload having an encrypted NDEF record payload and an authentication tag, wherein there is no creation of a new NDEF record;
    authenticating each authentication-encrypted NDEF record of the set of authentication-encrypted NDEF records based on the NDEF record header of each authentication-encrypted NDEF record, the authentication tag of the authentication-encrypted NDEF record payload of each authentication-encrypted NDEF record, and a value associated with each authentication-encrypted NDEF record;
    decrypting an encrypted NDEF record payload of an authentication-encrypted NDEF record payload of an authentication-encrypted NDEF record of the set of authentication-encrypted NDEF records when the authentication-encrypted NDEF record is authenticated; and refraining from obtaining an unprotected NDEF record payload corresponding to the authentication-encrypted NDEF record payload of the authentication-encrypted NDEF record of the set of authentication-encrypted NDEF records when the authentication-encrypted NDEF record is unauthenticated.

10. The method of claim 9, wherein for each authentication-encrypted NDEF record payload, the authentication tag is appended to the encrypted NDEF record payload.

11. The method of claim 9, wherein, for each authentication-encrypted NDEF record, the value associated with an authentication-encrypted NDEF record comprises one of a nonce associated with the authentication-encrypted NDEF record or a numerical position of the authentication-encrypted NDEF record in the protected NDEF message.

12. The method of claim 9, wherein, for each authentication-encrypted NDEF record, the value associated with an authentication-encrypted NDEF record is derived from one of a nonce associated with the authentication-encrypted NDEF record or a numerical position of the authentication-encrypted NDEF record in the protected NDEF message.

13. The method of claim 9, further comprising:
extracting each authentication-encrypted NDEF record from the protected NDEF message before the authenticating each authentication-encrypted NDEF record of the set of authentication-encrypted NDEF records;
obtaining an unprotected NDEF record for each authentication-encrypted NDEF record based on the NDEF record header of each authentication-encrypted NDEF record and the decrypted NDEF record payload; and
assembling each unprotected NDEF record in an unprotected NDEF message.

14. The method of claim 9, wherein the authenticating each authentication-encrypted NDEF record of the set of authentication-encrypted NDEF records comprises:
generating, for each authentication-encrypted NDEF record of the set of authentication-encrypted NDEF records, an expected tag based on the NDEF record header of the authentication-encrypted NDEF record and the value associated with the authentication-encrypted NDEF record; and
comparing the expected tag with the authentication tag of the authentication-encrypted NDEF record payload of the authentication-encrypted NDEF record,
wherein the authentication-encrypted NDEF record is authenticated when the expected tag matches the authentication tag, and the authentication-encrypted NDEF record is unauthenticated when the expected tag is different from the authentication tag.

15. The method of claim 9, wherein the protected NDEF message is received from the second device via an NFC link.

16. The method of claim 9, wherein the refraining from decrypting the encrypted NDEF record payload of the authentication-encrypted NDEF record payload of the authentication-encrypted NDEF record of the set of authentication-encrypted NDEF records when the authentication-encrypted NDEF record is unauthenticated comprises:
discarding the encrypted NDEF record payload of the authentication-encrypted NDEF record of the authentication-encrypted NDEF record of the set of authentication-encrypted NDEF records when the authentication-encrypted NDEF record is unauthenticated.

17. An apparatus comprising:
a memory; and
at least one processor coupled to the memory and configured to:
generate a set of Near Field Communication (NFC) Forum Data Exchange Format (NDEF) records, each NDEF record of the set of NDEF records including an NDEF record header and an NDEF record payload;
apply an authentication-encryption function to each NDEF record of the set of NDEF records based on the NDEF record header of each NDEF record, the NDEF record payload of each NDEF record, and a value associated with each NDEF record to obtain a set of authentication-encrypted NDEF record payloads respectively corresponding to the set of NDEF records, wherein each authentication-encrypted NDEF record payload includes an encrypted NDEF record payload and an authentication tag associated with a corresponding NDEF record, wherein there is no creation of a new NDEF record; and
transmit a protected NDEF message including the set of authentication-encrypted NDEF records to a second device, wherein each authentication-encrypted NDEF record includes the NDEF record header of the corresponding NDEF record and the authentication-encrypted NDEF record payload.

18. The apparatus of claim 17, wherein for each authentication-encrypted NDEF record payload, the authentication tag is appended to the encrypted NDEF record payload.

19. The apparatus of claim 17, wherein the at least one processor is further configured to:
extract each NDEF record of the set of NDEF records from an unprotected NDEF message before the application of the authentication-encryption function to each NDEF record of the set of NDEF records; and
assemble the set of authentication-encrypted NDEF records in the protected NDEF message after the application of the authentication-encryption function to each NDEF record of the set of NDEF records.

20. The apparatus of claim 19, wherein the value associated with each NDEF record comprises one of a nonce associated with the corresponding NDEF record or a numerical position of the corresponding NDEF record in the unprotected NDEF message.

21. The apparatus of claim 19, wherein the value associated with each NDEF record is derived from one of a nonce associated with the corresponding NDEF record or a numerical position of the corresponding NDEF record in the unprotected NDEF message.

22. The apparatus of claim 17, wherein the application of an authentication-encryption function to each NDEF record of the set of NDEF records comprises to:
provide, to the authentication-encryption function as inputs, the NDEF record header of the NDEF record of the set of NDEF records, the NDEF record payload of the NDEF record, and the value associated with the NDEF record;
obtain, from the authentication-encryption function, the encrypted NDEF record payload and the authentication tag of the authentication-encrypted NDEF record of the set of authentication-encrypted NDEF records, the encrypted NDEF record payload being obtained based on the NDEF record payload and the authentication tag of the authentication-encrypted NDEF record being obtained based on the NDEF record header and the value associated with the NDEF record.

23. The apparatus of claim 17, wherein the protected NDEF message is transmitted to the second device via an NFC link.

24. The apparatus of claim 17, wherein the at least one processor is further configured to:
modify at least a first NDEF record header of a first NDEF record of the set of NDEF records when a length of a first NDEF record payload of the first NDEF record is different from a length of a first authentication-encrypted NDEF record payload of the first NDEF record based on the applying the authentication-encryption function to each NDEF record of the set of NDEF records.

25. An apparatus comprising:
a memory; and
at least one processor coupled to the memory and configured to:
receive a protected Near Field Communication (NFC) Forum Data Exchange Format (NDEF) message including a set of authentication-encrypted NDEF records from a second device, each authentication-encrypted NDEF record of the set of authentication-encrypted NDEF records including an NDEF record header and an authentication-encrypted NDEF record payload having an encrypted NDEF record payload and an authentication tag, wherein there is no creation of a new NDEF record;
authenticate each authentication-encrypted NDEF record of the set of authentication-encrypted NDEF records based on the NDEF record header of each authentication-encrypted ND EF record, the authentication tag of the authentication-encrypted NDEF record payload of each authentication-encrypted NDEF record, and a value associated with each authentication-encrypted NDEF record;
decrypt an encrypted NDEF record payload of an authentication-encrypted NDEF record payload of an authentication-encrypted NDEF record of the set of authentication-encrypted NDEF records when the authentication-encrypted NDEF record is authenticated; and
refrain from obtaining an unprotected NDEF record payload corresponding to the authentication-encrypted NDEF record payload of the authentication-encrypted NDEF record of the set of authentication-encrypted NDEF records when the authentication-encrypted NDEF record is unauthenticated.

26. The apparatus of claim 25, wherein for each authentication-encrypted NDEF record payload, the authentication tag is appended to the encrypted NDEF record payload.

27. The apparatus of claim 25, wherein, for each authentication-encrypted NDEF record, the value associated with an authentication-encrypted NDEF record comprises one of a nonce associated with the authentication-encrypted NDEF record or a numerical position of the authentication-encrypted NDEF record in the protected NDEF message.

28. The apparatus of claim 25, wherein, for each authentication-encrypted NDEF record, the value associated with an authentication-encrypted NDEF record is derived from one of a nonce associated with the authentication-encrypted NDEF record or a numerical position of the authentication-encrypted NDEF record in the protected NDEF message.

29. The apparatus of claim 25, wherein the at least one processor is further configured to:
extract each authentication-encrypted NDEF record from the protected NDEF message before the authenticating each authentication-encrypted NDEF record of the set of authentication-encrypted NDEF records;
obtain an unprotected NDEF record for each authentication-encrypted NDEF record based on the NDEF record header of each authentication-encrypted NDEF record and the decrypted NDEF record payload; and
assemble each unprotected NDEF record in an unprotected NDEF message.

30. The apparatus of claim 25, wherein the authentication of each authentication-encrypted NDEF record of the set of authentication-encrypted NDEF records comprises to:
generate, for each authentication-encrypted NDEF record of the set of authentication-encrypted NDEF records, an expected tag based on the NDEF record header of the authentication-encrypted NDEF record and the value associated with the authentication-encrypted NDEF record; and
compare the expected tag with the authentication tag of the authentication-encrypted NDEF record payload of the authentication-encrypted NDEF record,
wherein the authentication-encrypted NDEF record is authenticated when the expected tag matches the authentication tag, and the authentication-encrypted NDEF record is unauthenticated when the expected tag is different from the authentication tag.

31. An apparatus comprising:
means for generating a set of Near Field Communication (NFC) Forum Data Exchange Format (NDEF) records, each NDEF record of the set of NDEF records including an NDEF record header and an NDEF record payload;
means for applying an authentication-encryption function to each NDEF record of the set of NDEF records based on the NDEF record header of each NDEF record, the NDEF record payload of each NDEF record, and a value associated with each NDEF record to obtain a set of authentication-encrypted NDEF record payloads respectively corresponding to the set of NDEF records, wherein each authentication-encrypted NDEF record payload includes an encrypted NDEF record payload and an authentication tag associated with a corresponding NDEF record, wherein there is no creation of a new record; and
means for transmitting a protected NDEF message including the set of authentication-encrypted NDEF records to a second device, wherein each authentication-encrypted NDEF record includes the NDEF record header of the corresponding NDEF record and the authentication-encrypted NDEF record payload.

32. An apparatus comprising:
means for receiving a protected Near Field Communication (NFC) Forum Data Exchange Format (NDEF) message including a set of authentication-encrypted NDEF records from a second device, each authentication-encrypted NDEF record of the set of authentication-encrypted NDEF records including an NDEF record header and an authentication-encrypted NDEF record payload having an encrypted NDEF record payload and an authentication tag, wherein there is no creation of a new NDEF record;
means for authenticating each authentication-encrypted NDEF record of the set of authentication-encrypted NDEF records based on the NDEF record header of each authentication-encrypted ND EF record, the authentication tag of the authentication-encrypted NDEF record payload of each authentication-encrypted NDEF record, and a value associated with each authentication-encrypted NDEF record;

means for decrypting an encrypted NDEF record payload of an authentication-encrypted NDEF record payload of an authentication-encrypted NDEF record of the set of authentication-encrypted NDEF records when the authentication-encrypted NDEF record is authenticated; and means for refraining from obtaining an unprotected NDEF record payload corresponding to the authentication-encrypted NDEF record payload of the authentication-encrypted NDEF record of the set of authentication-encrypted NDEF records when the authentication-encrypted NDEF record is unauthenticated.

33. A non-transitory computer-readable medium storing computer-executable code for wireless communication by a wireless communications device, comprising code to:

generate a set of Near Field Communication (NFC) Forum Data Exchange Format (NDEF) records, each NDEF record of the set of NDEF records including an NDEF record header and an NDEF record payload;

apply an authentication-encryption function to each NDEF record of the set of NDEF records based on the NDEF record header of each NDEF record, the NDEF record payload of each NDEF record, and a value associated with each NDEF record to obtain a set of authentication-encrypted NDEF record payloads respectively corresponding to the set of NDEF records, wherein each authentication-encrypted NDEF record payload includes an encrypted NDEF record payload and an authentication tag associated with a corresponding NDEF record, wherein there is no creation of a new NDEF record; and transmit a protected NDEF message including the set of authentication-encrypted NDEF records to a second device, wherein each authentication-encrypted NDEF record includes the NDEF record header of the corresponding NDEF record and the authentication-encrypted NDEF record payload.

34. A non-transitory computer-readable medium storing computer-executable code for wireless communication by a wireless communications device, comprising code to:

receive a protected Near Field Communication (NFC) Forum Data Exchange Format (NDEF) message including a set of authentication-encrypted NDEF records from a second device, each authentication-encrypted NDEF record of the set of authentication-encrypted NDEF records including an NDEF record header and an authentication-encrypted NDEF record payload having an encrypted NDEF record payload and an authentication tag, wherein there is no creation of a new NDEF record;

authenticate each authentication-encrypted NDEF record of the set of authentication-encrypted NDEF records based on the NDEF record header of each authentication-encrypted NDEF record, the authentication tag of the authentication-encrypted NDEF record payload of each authentication-encrypted NDEF record, and a value associated with each authentication-encrypted NDEF record;

decrypt an encrypted NDEF record payload of an authentication-encrypted NDEF record payload of an authentication-encrypted NDEF record of the set of authentication-encrypted NDEF records when the authentication-encrypted NDEF record is authenticated; and refrain from obtaining an unprotected NDEF record payload corresponding to the authentication-encrypted NDEF record payload of the authentication-encrypted NDEF record of the set of authentication-encrypted NDEF records when the authentication-encrypted NDEF record is unauthenticated.

\* \* \* \* \*